US010306078B2

(12) United States Patent
Imai et al.

(10) Patent No.: US 10,306,078 B2
(45) Date of Patent: May 28, 2019

(54) MONITORING APPARATUS, MONITORING METHOD, AND RECORDING MEDIUM

(71) Applicant: SEIKO EPSON CORPORATION, Tokyo (JP)

(72) Inventors: Toshie Imai, Matsumoto (JP); Ryosuke Kakio, Matsumoto (JP); Tomoki Takahashi, Sapporo (JP); Eiichi Harada, Matsumoto (JP); Tetsuya Wakasa, Sapporo (JP); Hiroyasu Ogata, Sapporo (JP); Tomonobu Ozawa, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/728,111

(22) Filed: Oct. 9, 2017

(65) Prior Publication Data
US 2018/0103159 A1 Apr. 12, 2018

(30) Foreign Application Priority Data

Oct. 11, 2016 (JP) ................. 2016-199738

(51) Int. Cl.
H04N 1/00 (2006.01)
(52) U.S. Cl.
CPC ..... H04N 1/00042 (2013.01); H04N 1/00222 (2013.01); H04N 1/00244 (2013.01); H04N 1/00474 (2013.01); H04N 2201/0094 (2013.01)
(58) Field of Classification Search
CPC .. G06F 11/2284; G06F 1/3228; G06F 1/3284; G06F 3/1213; G06F 3/1221; G06F 3/1229; G06F 3/126; G06F 3/1285; H04N 2201/0094; H04N 1/00037; H04N 1/00042; H04N 1/00061; H04N 1/00087;
(Continued)

(56) References Cited

U.S. PATENT DOCUMENTS

2010/0188698 A1* 7/2010 Koizumi ............ G03G 15/5004
358/1.15
2011/0010571 A1* 1/2011 Dance .................. G06F 1/3228
713/323

(Continued)

FOREIGN PATENT DOCUMENTS

JP 2012-221193 A 11/2012

Primary Examiner — Negussie Worku
(74) Attorney, Agent, or Firm — Foley & Lardner LLP

(57) ABSTRACT

A monitoring apparatus is configured to acquire, from a multi-function apparatus including a first device and a second device, first device information regarding the first device and being a collection target and second device information regarding the second device and being a collection target, the monitoring apparatus including: a status information acquisition unit configured to acquire from the first device, at a monitoring timing of the multi-function apparatus, status information denoting a state of the first device; and a device information acquisition unit configured to acquire the first device information from the first device and the second device information from the second device, wherein the device information acquisition unit does not perform acquisition of the second device information from the second device when the status information acquired by the status information acquisition unit is information denoting a sleep mode of the first device.

20 Claims, 13 Drawing Sheets

(58) Field of Classification Search
CPC ........... H04N 1/00222; H04N 1/00244; H04N 1/00344; H04N 1/00474; H04N 1/00896
USPC ...... 358/1.14, 1.15, 1.16; 713/323, 300, 320
See application file for complete search history.

(56) References Cited

U.S. PATENT DOCUMENTS

| | | | |
|---|---|---|---|
| 2012/0236366 A1* | 9/2012 | Imai | G06K 15/1852 358/2.1 |
| 2012/0243060 A1* | 9/2012 | Imai | H04N 1/00726 358/475 |
| 2012/0327452 A1* | 12/2012 | Tomi | G06F 11/2284 358/1.14 |
| 2018/0115654 A1* | 4/2018 | Imai | H04L 43/10 |
| 2018/0115674 A1* | 4/2018 | Imai | H04N 1/00896 |

\* cited by examiner

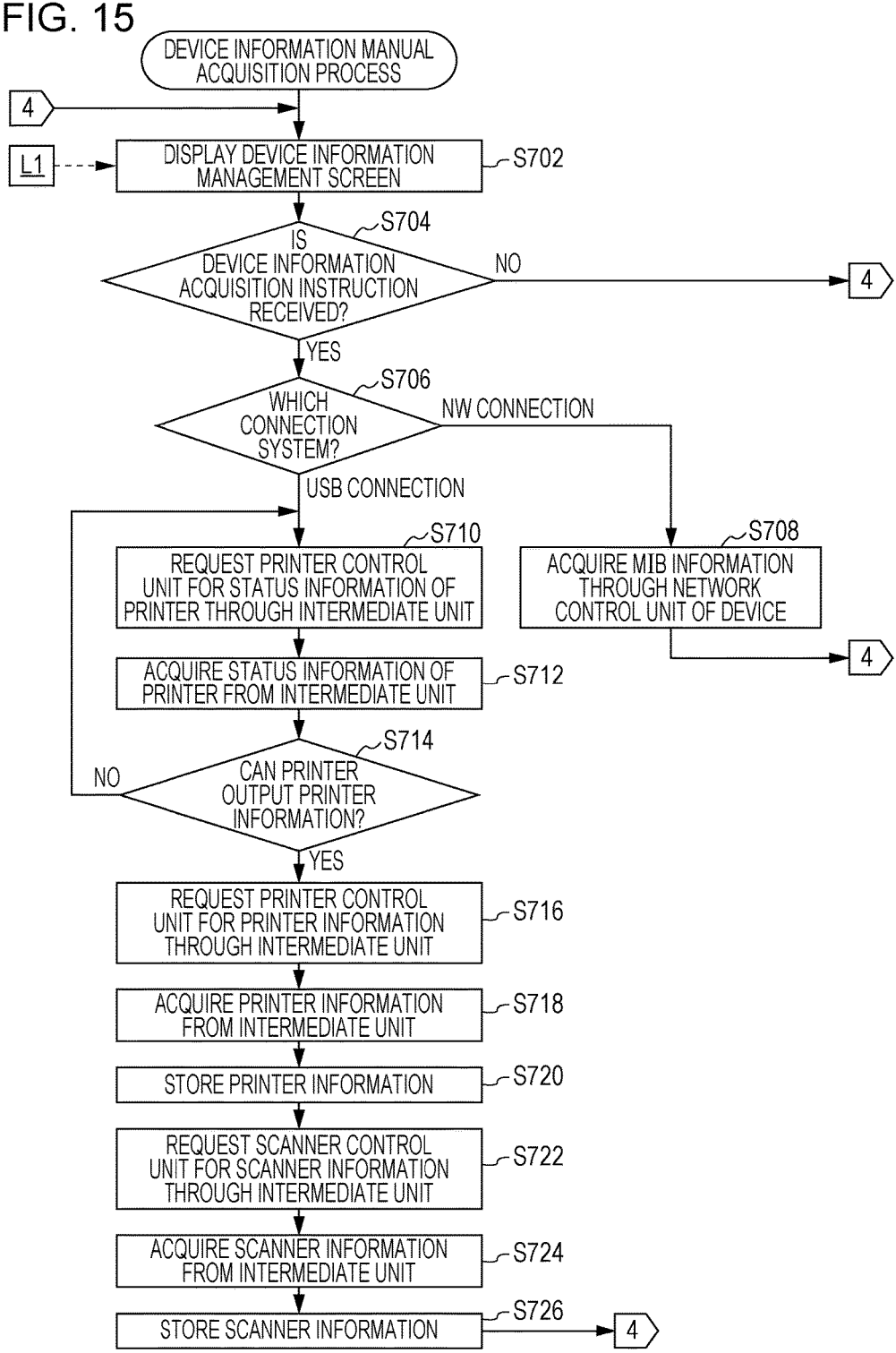

MONITORING APPARATUS, MONITORING METHOD, AND RECORDING MEDIUM

BACKGROUND

1. Technical Field

The present invention relates to a technique for obtaining device information from a multi-function device.

2. Related Art

It is common practice to connect, in addition to a server computer and a client computer, a device such as a printer, a scanner, a facsimile, or a multi-function device (an example of a multi-function apparatus) having printer, scanner, and facsimile functions over a network. To reduce power consumption of these devices, sleep mode (also referred to as power-saving mode) is enabled for low power consumption when the devices have not been used for a predetermined period. Moreover, in order to monitor the amount of remaining consumables such as ink of each device, a monitoring server is installed to collect device information. However, when device information needs to be collected from a device in sleep mode, the sleep mode of the device is terminated, and power consumption increases for device information collection.

JP-A-2012-221193 describes a problem that when a device in sleep mode polled by a server, the sleep mode of the device is terminated, thereby causing unnecessary power consumption. In the device management system described in JP-A-2012-221193, the polling frequency of a device in sleep mode is reduced by setting a large polling interval for a device with a low frequency of use on the basis of the frequency of use of client devices logged on to a server.

However, when setting the polling interval based on the frequency of use of the device, whether or not the device is in sleep mode is unknown. Thus, the device may be in sleep mode when polled, and in this case, electric power is unnecessarily consumed.

SUMMARY

An advantage of some aspects of the invention is to provide a technique enabling a reduction in power consumption by a multi-function device.

To achieve the advantage, an aspect of the present invention is a monitoring apparatus which is configured to acquire, from a multi-function apparatus including a first device and a second device, first device information regarding the first device and being a collection target and second device information regarding the second device and being a collection target, the monitoring apparatus including: a status information acquisition unit configured to acquire from the first device, at a monitoring timing of the multi-function apparatus, status information denoting a state of the first device; and a device information acquisition unit configured to acquire the first device information from the first device and the second device information from the second device, wherein the device information acquisition unit does not perform acquisition of the second device information from the second device when the status information acquired by the status information acquisition unit is information denoting a sleep mode of the first device.

Moreover, an aspect of the invention is a monitoring method for acquiring from a multi-function apparatus including a first device and a second device, first device information regarding the first device and being a collection target and second device information regarding the second device and being a collection target, the monitoring method including: acquiring from the first device, at a monitoring timing of the multi-function apparatus, status information denoting a state of the first device; and acquiring the first device information from the first device and the second device information from the second device, wherein in the acquiring of the first device information and the second device information, acquisition of the second device information from the second device is not performed when the status information acquired by the acquisition of the status information is information denoting a sleep mode of the first device.

Moreover, an aspect of the invention is a monitoring program for acquiring from a multi-function apparatus including a first device and a second device, first device information regarding the first device and being a collection target and second device information regarding the second device and being a collection target, the monitoring program causes a computer to execute: a status information acquisition function of acquiring from the first device, at a monitoring timing of the multi-function apparatus, status information denoting a state of the first device and a device information acquisition function of acquiring the first device information from the first device and the second device information from the second device, wherein the device information acquisition function does not perform acquisition of the second device information from the second device when the status information acquired by the status information acquisition function is information denoting a sleep mode of the first device.

With the above-mentioned aspects, it is possible to provide a technique enabling a reduction in power consumption by a multi-function apparatus.

BRIEF DESCRIPTION OF THE DRAWINGS

The invention will be described with reference to the accompanying drawings, wherein like numbers reference like elements.

FIG. 15 is a flowchart illustrating an example of a device information manual acquisition process.

DESCRIPTION OF EXEMPLARY EMBODIMENTS

Figure 1:
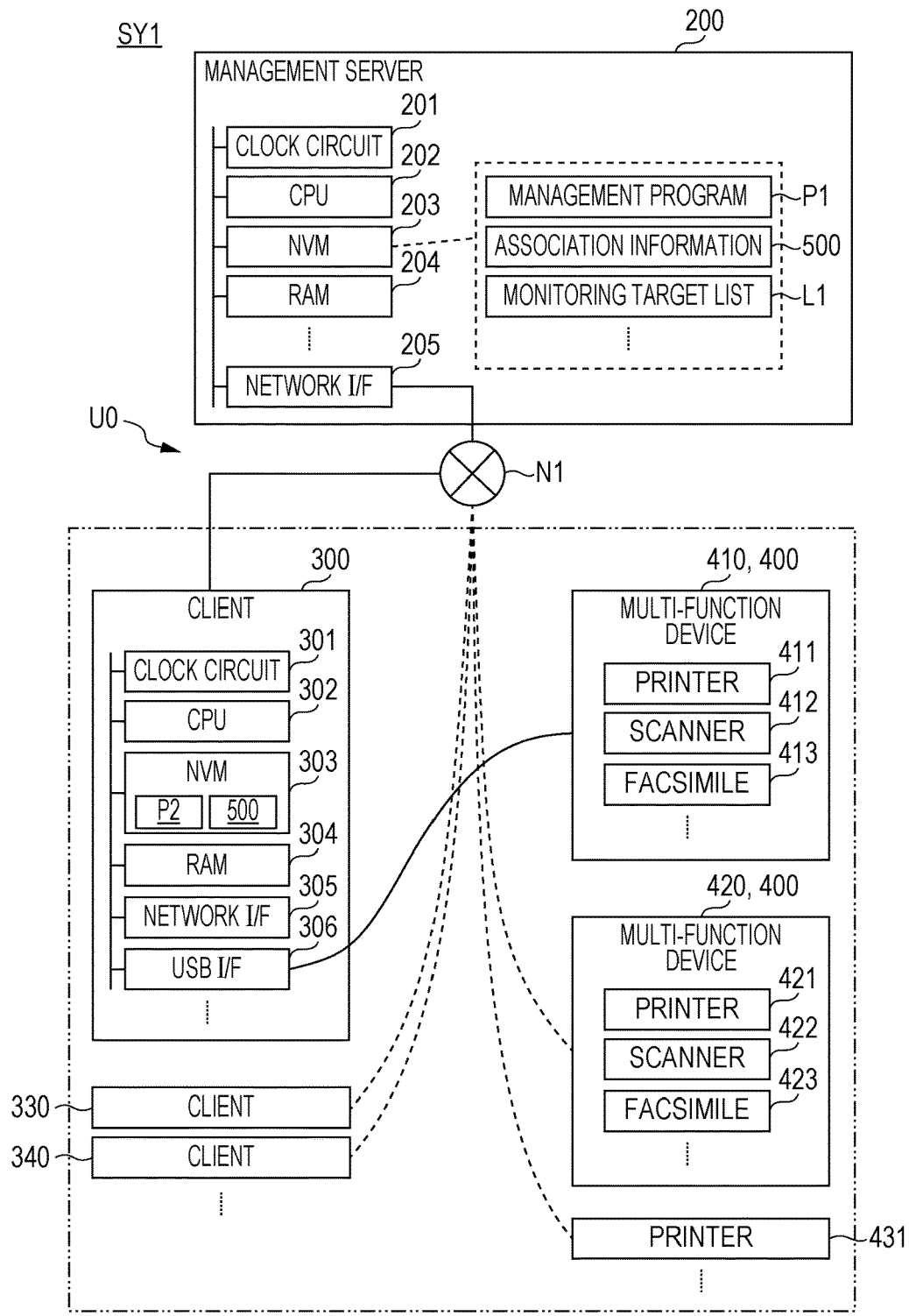
FIG. 1 is a block diagram schematically illustrating an example of a management system including a monitoring apparatus.

Embodiments of the invention will be described below. The following embodiments are mere examples of the present invention, and not all features shown in the embodiments are necessary needed to solve the above-mentioned issue.

(1) Outline of Technique Included in Invention

First, with reference to examples shown in FIGS. 1 to 15, an outline of a technique included in the invention will be described. Note that the drawings of the present application schematically show examples, and thus, the dimensions in the drawings are not consistent in some cases. Elements of the present technique are not limited to specific examples denoted by reference symbols.

First Aspect

A monitoring apparatus U0 according to one aspect of the present technique includes a status information acquisition unit U1 and a device information acquisition unit U2 and acquires from a multi-function apparatus (for example, a multi-function device 400) including a first device (for example, a printer 411) and a second device (for example, a scanner 412), first device information (for example, printer information 621) regarding the first device (411) and being a collection target and second device information (for example, scanner information 622) regarding the second device (412) and being a collection target. The status information acquisition unit U1 acquires from the first device (411), at a monitoring timing of the multi-function apparatus (400), status information 610 representing a state of the first device (411). The device information acquisition unit U2 acquires the first device information (621) from the first device (411) and the second device information (622) from the second device (412). Here, the device information acquisition unit U2 does not perform acquisition of the second device information (622) from the second device (412) when the status information 610 acquired by the status information acquisition unit U1 is information denoting sleep mode of the first device (411).

When the first device (411) is in sleep mode, the second device (412) included in the same multi-function apparatus (400) as the first device (411) is also highly possibly in sleep mode. In the first aspect, when the first device (411) is in sleep mode, the acquisition of the second device information (622) from the second device (412) is not performed. Thus, the termination frequency of the sleep mode of the second device (412) decreases. Therefore, the first aspect enables providing of a monitoring apparatus which enables a reduction in power consumption by a multi-function apparatus.

Here, examples of the first device and the second device include printing apparatuses, image scanners, facsimiles, copiers, and memory devices. Note that the first device and the second device are included in an identical multi-function apparatus but are different devices.

It is only required that the multi-function apparatus includes a plurality of devices, wherein all the devices may be accommodated in an identical housing, or the multi-function apparatus may include a plurality of distributed devices such that the first device and the second device are accommodated in different housings. Thus, examples of the devices included in the multi-function apparatus include devices externally connected to a main body of the multi-function apparatus.

It is only required that the state of the first device includes sleep mode, and the state may include a mode in which first device information can be output, a mode in which the first device information cannot be output, and other modes.

Examples of the first device information and the second device information include information denoting the amount of remaining consumables and information denoting the period of use of consumables.

Examples of acquisition of the status information from the first device include direct acquisition of the status information from the first device and acquisition of the status information from the first device via an intermediate element. Examples of acquisition of the first device information from the first device include direct acquisition of the first device information from the first device and acquisition of the first device information from the first device via an intermediate element. Examples of acquisition of the second device information from the second device include direct acquisition of the second device information from the second device and acquisition of the second device information from the second device via an intermediate element.

Second Aspect

Figure 8:
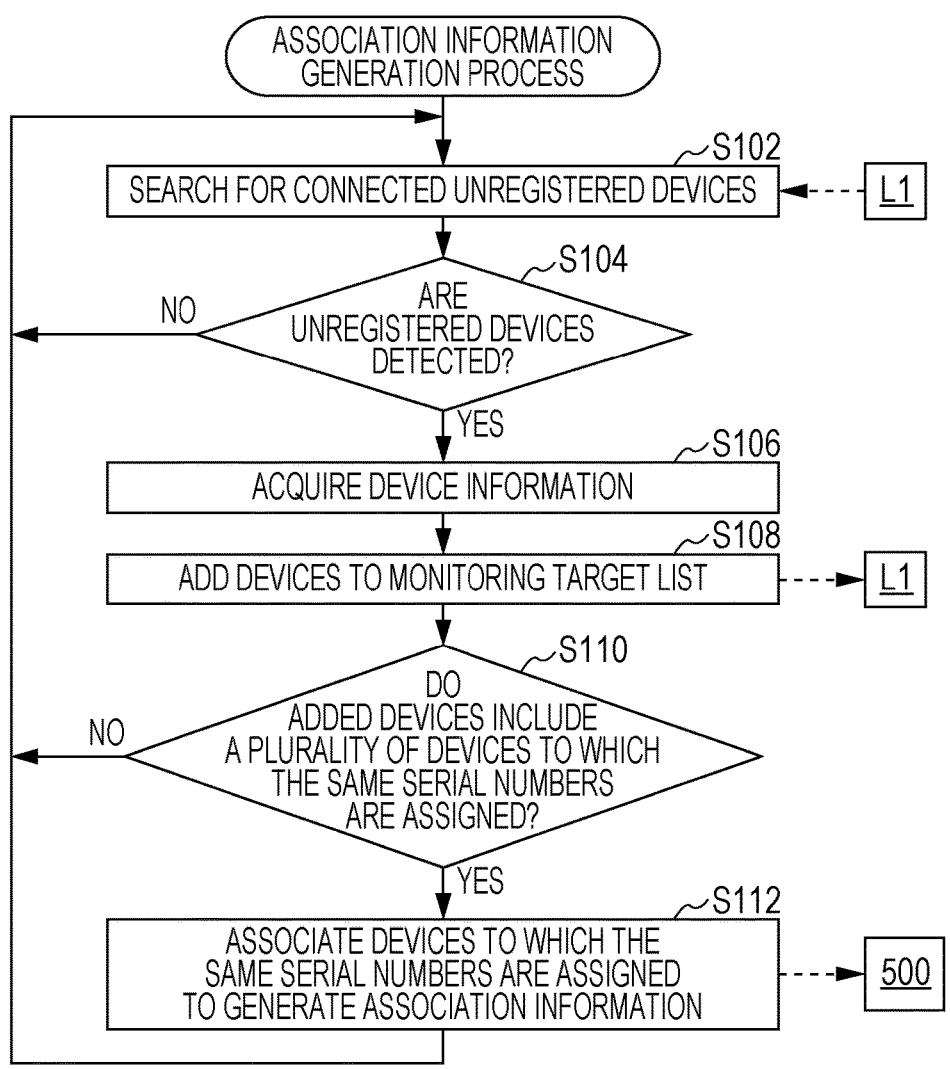
FIG. 8 is a flowchart illustrating an example of an association information generation process.

As illustrated in, for example, FIG. 8, the monitoring apparatus U0 may include an association information generation unit U3 configured to individually acquire, from a plurality of devices including the first device (411) and the second device (412), specific information (510) of the devices and to generate association information 500 associating the first device (411) and the second device (412) with each other by identifying the first device (411) and the second device (412) included in the multi-function apparatus (400) on the basis of the individual specific information (510). As illustrated in, for example, FIG. 9, the status information acquisition unit U1 may acquire the status information 610 from the first device (411) specified by the association information 500. When the status information 610 is information denoting the sleep mode, the device information acquisition unit U2 does not have perform the acquisition of the second device information (622) from the second device (412) specified by the association information 500.

According to the present aspect, the first device (411) and the second device (412) included in the multi-function apparatus (400) are automatically identified, and therefore, it is possible to provide a preferred monitoring apparatus which reduces power consumption by the multi-function apparatus.

Examples of the specific information include the serial number, the Media Access Control Address (MAC address), the model name, and the like of a device.

Note that a case where the monitoring apparatus includes no association information generation unit is also include in the present technique includes.

Third Aspect

Figure 10:
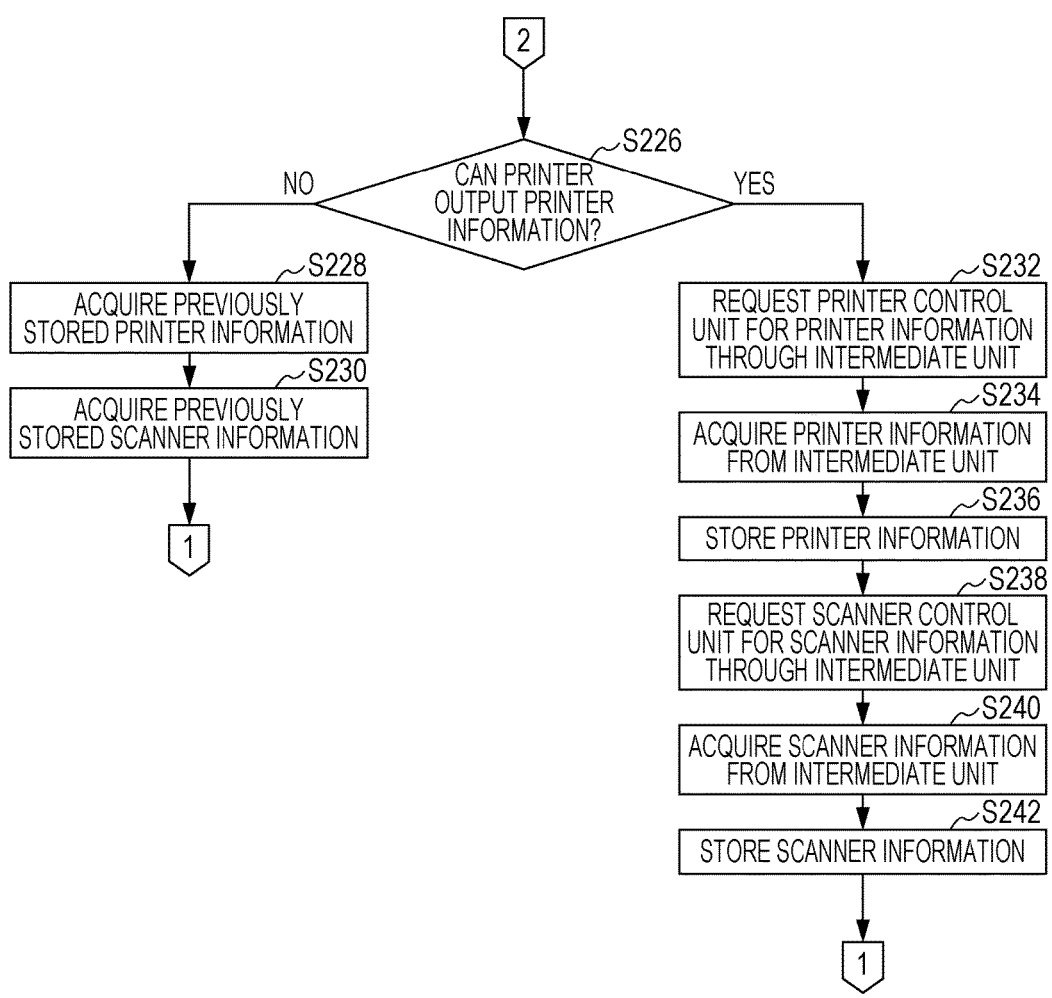
FIG. 10 is a flowchart illustrating an example of the main process performed on the monitoring server.

As illustrated in, for example, FIG. 10, when the status information 610 acquired by the status information acquisition unit U1 is not information denoting the sleep mode and is information denoting that the first device (411) can output the first device information (621), the device information acquisition unit U2 may acquire, for a monitoring process performed at the monitoring timing, the first device information (621) from the first device (411) and the second device information (622) from the second device (412). Moreover, the device information acquisition unit U2 may store the first device information (621) and the second device information (622) which have been acquired in a storage unit U7.

According to the present aspect, when first device (411) is not in sleep mode and the first device (411) can output the first device information (621), the first device information (621) and the second device information (622) are acquired. Therefore, the present aspect can provide a preferred example of a reduction in the power consumption of the multi-function apparatus.

Fourth Aspect

Figure 9:
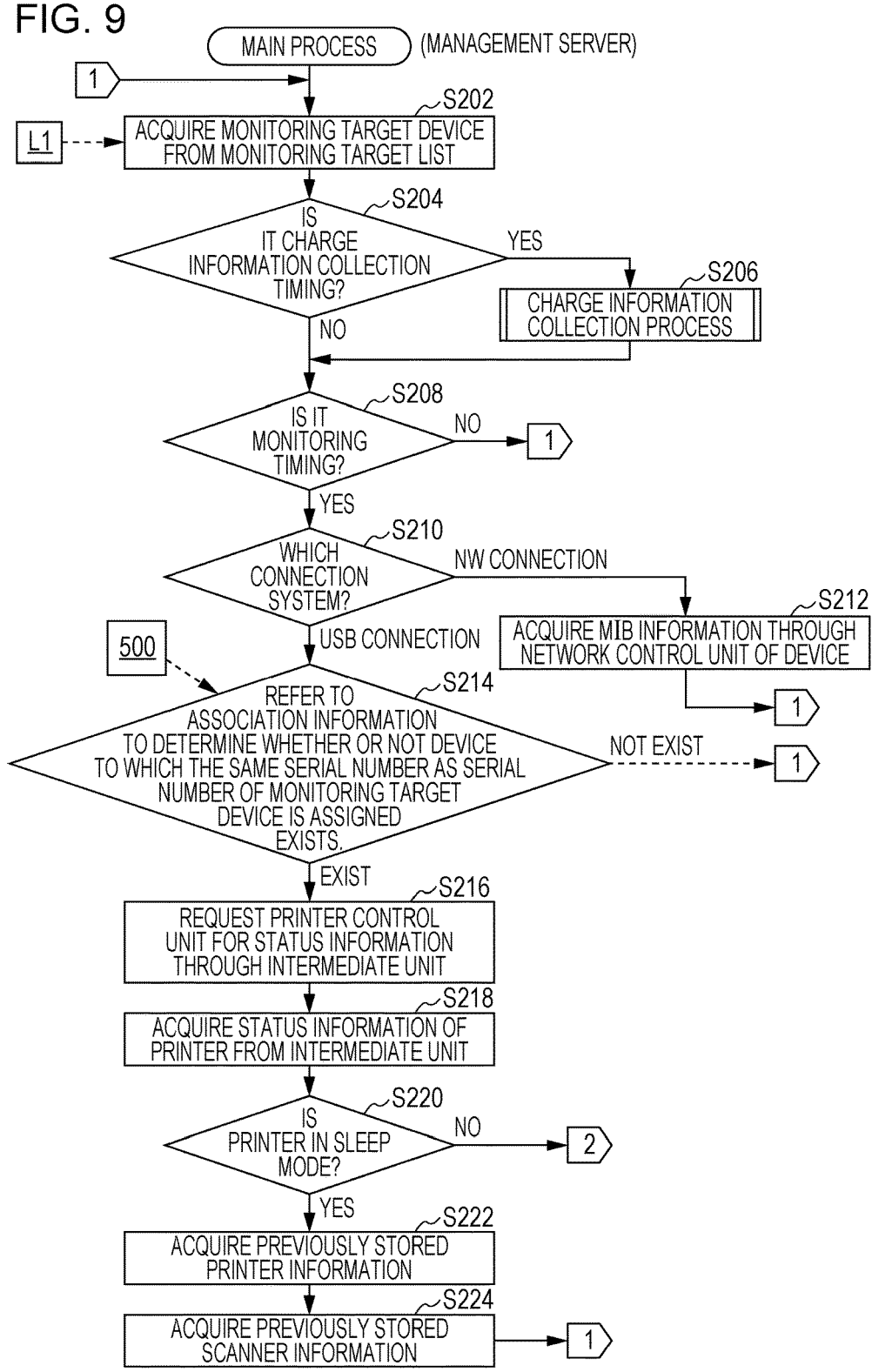
FIG. 9 is a flowchart illustrating an example of a main process performed on a monitoring server.

As illustrated in, for example, FIG. 9, when the status information 610 acquired by the status information acquisition unit U1 is information denoting the sleep mode, the device information acquisition unit U2 may use, for the monitoring process, the first device information (621) and the second device information (622) which have been most recently stored in the storage unit U7. According to this aspect, even when the first device information (621) and the second device information (622) cannot be acquired respectively from the first device (411) and the second device (412) due to the first device (411) being in sleep mode at the monitoring timing, the monitoring process can be performed. Thus, the present aspect can provide a preferred example of a reduction in the power consumption by the multi-function apparatus.

Fifth Aspect

As illustrated in, for example, FIG. 10, when the status information 610 acquired by the status information acquisition unit U1 is information denoting that the first device (411) cannot output the first device information (621), the device information acquisition unit U2 may use, for the monitoring process, the first device information (621) and the second device information (622) which have been most recently stored in the storage unit U7. According to this aspect, even when the first device information (621) and the second device information (622) cannot be acquired respectively from the first device (411) and the second device (412) due to the first device (411) not being able to output the first device information (621) at the monitoring timing, the monitoring process can be performed. Thus, the present aspect can provide a preferred example of a reduction in the power consumption by the multi-function apparatus.

Here, examples of the information denoting that the first device information cannot be output include information denoting that printing is being performed, information denoting that an image is being read, information denoting that firmware of the device is being updated, and other information.

Sixth Aspect

Figure 11:
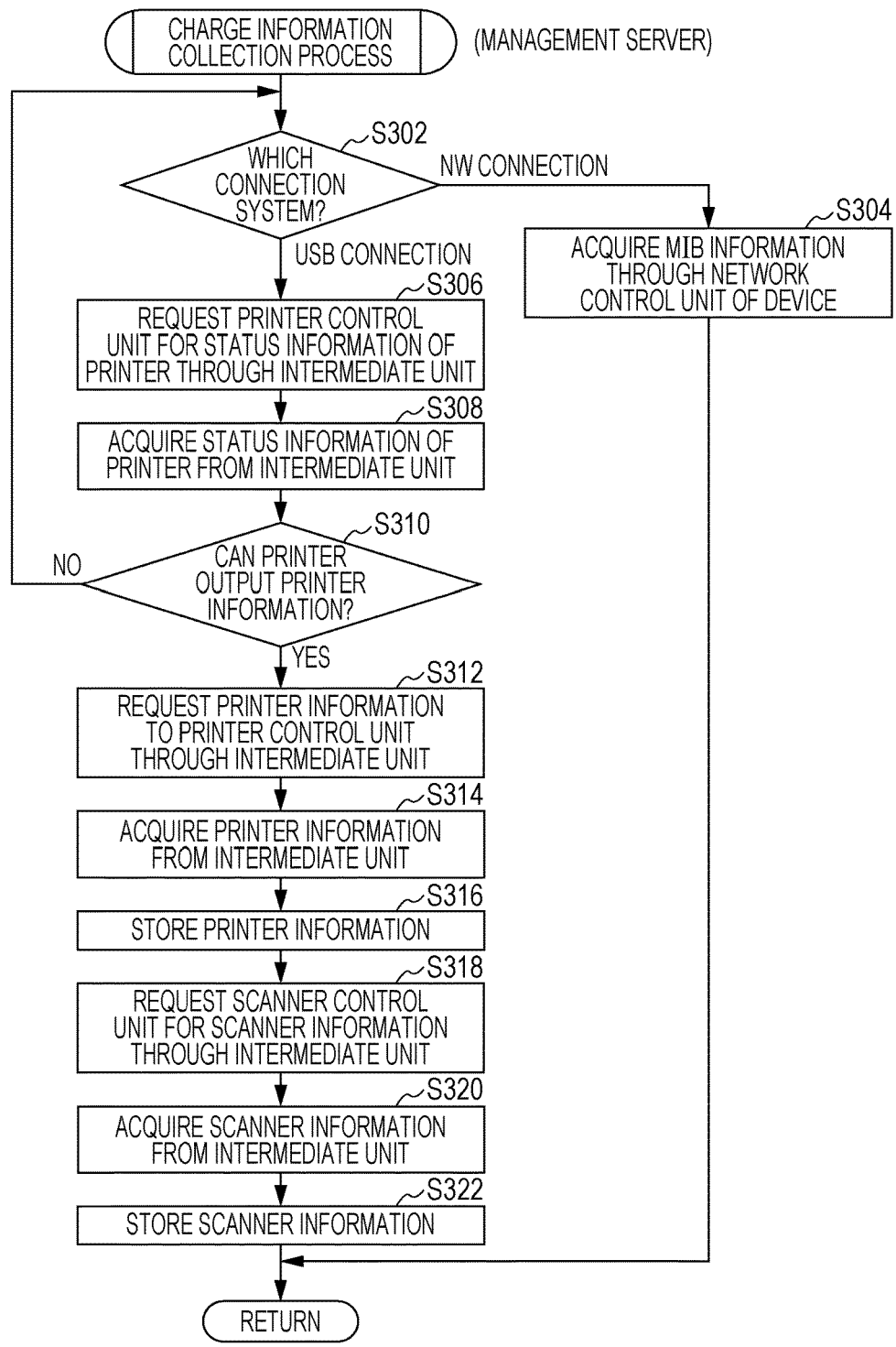
FIG. 11 is a flowchart illustrating an example of a charge information collection process performed on the monitoring server.

As illustrated in, for example, FIGS. 9 and 11, the present monitoring apparatus U0 may include a charge information collection unit U4 which performs, at a charge information collection timing at which charge information regarding the use of the multi-function apparatus (400) is collected, at least one of a process of acquiring the first device information (621) for collection of the charge information from the first device (411) and a process of acquiring the second device information (622) for collection of the charge information from the second device (412) regardless of whether or not the status information 610 is information denoting the sleep mode. According to this aspect, even when the first device (411) is in sleep mode at a timing at which the charge information is collected, device information for collection of the charge information is acquired, and therefore, it is possible to provide a preferred example of a case of charging.

Note that a case where the monitoring apparatus includes no charge information collection unit is also included in the present technique.

Seventh Aspect

As illustrated in, for example, FIG. 15, the monitoring apparatus U0 may include a reception unit U5 configured to receive an instruction from a user to acquire the first device information (621). When the reception unit U5 receives an instruction of acquiring the first device information (621), the device information acquisition unit U2 may acquire the first device information (621) from the first device (411) regardless of whether or not the status information 610 is information denoting the sleep mode.

According to the present aspect, when a user instructs acquisition of the first device information (621), the first device information (621) is acquired from the first device (411) even when the first device (411) is in sleep mode, and therefore, it is possible to improve convenience.

Note that a case where the monitoring apparatus includes no reception unit is also included in the present technique includes.

Eighth Aspect

Figure 3:
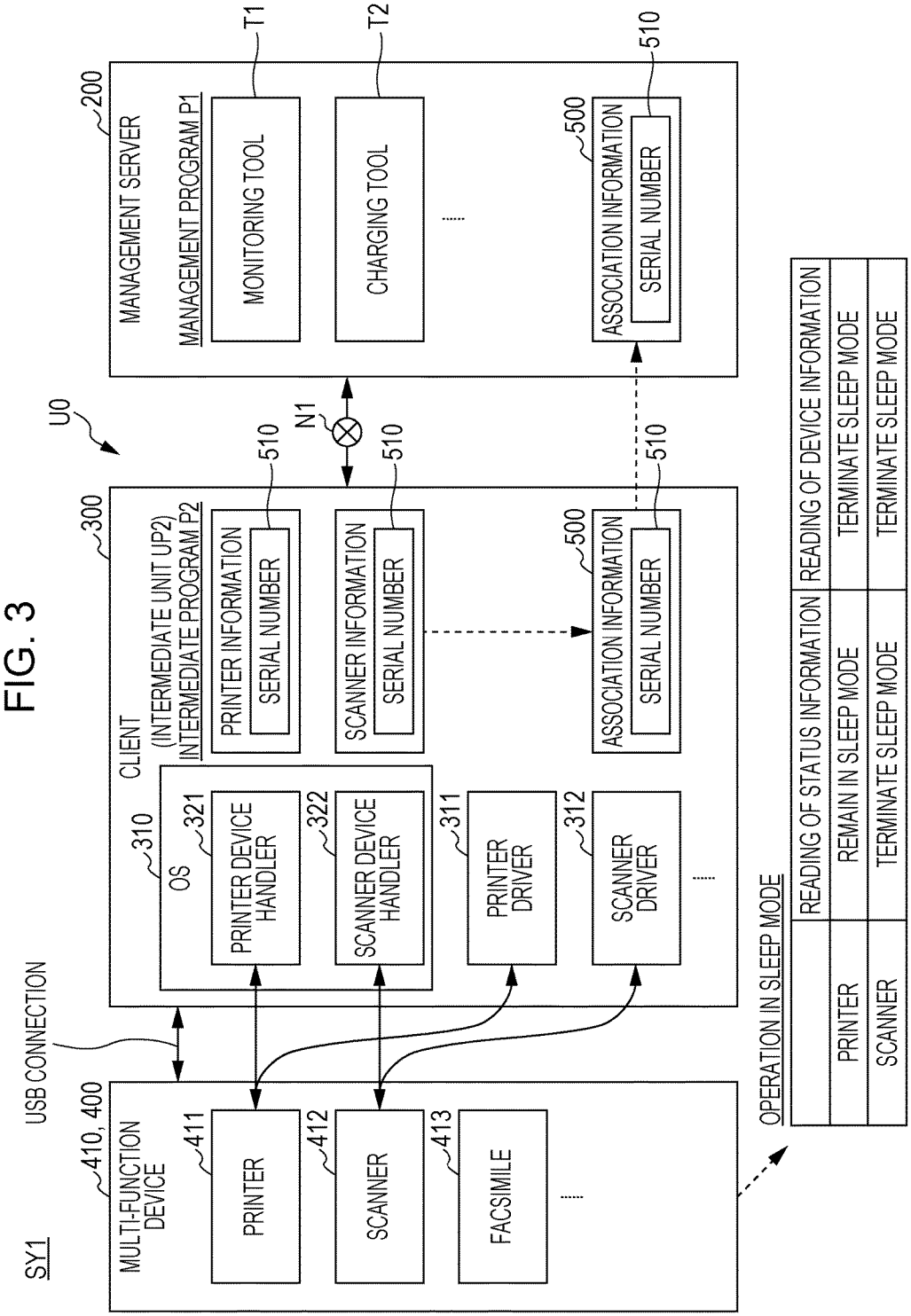
FIG. 3 is a block diagram schematically illustrating an example of the management system including the monitoring apparatus to which the multi-function apparatus is connected via a USB.

As illustrated in, for example, FIG. 3, the first device (411) may be a printing apparatus. The second device (412) may be an image scanner. This aspect enables providing of a monitoring apparatus which enables a reduction in power consumption by a multi-function apparatus including a printing apparatus and an image scanner.

Ninth Aspect

As illustrated in, for example, FIGS. 9 and 10, the device information acquisition unit U2 may perform the following processes (a) and (b) when acquiring the first device information (621) from the first device (411): (a) a process of acquiring the first device information (621) from the multi-function apparatus (400) via a network N1 when the monitoring apparatus U0 is connected to the multi-function apparatus (400) via the network N1; and (b) a process of acquiring the first device information (621) via a first device driver (311) for controlling the first device (411) when the monitoring apparatus U0 is connected to the multi-function apparatus (400) via a Universal Serial Bus (USB) interface.

When the multi-function apparatus (400) is connected to a computer via the USB interface, the first device (411) and the second device (412) in an identical multi-function apparatus (400) may be identified as different devices depending on the specification of the operating system (OS) of the computer. Thus, when the monitoring apparatus U0 is connected to the multi-function apparatus (400) via the USB interface, acquiring the first device information (621) via the first device driver (311) is preferable. In contrast, when the multi-function apparatus (400) is connected to a computer via the network N1, the multi-function apparatus (400) including the first device (411) and the second device (412) is often identified as one device. Thus, when the monitoring apparatus U0 is connected to the multi-function apparatus (400) via the network N1, the first device information (621) is preferably acquired from the multi-function apparatus (400) via the network N1.

Thus, the present aspect can provide a preferred example of a reduction in the power consumption by the multi-function apparatus.

Tenth Aspect

As illustrated in, for example, FIGS. 9 and 10, the device information acquisition unit U2 may perform the following processes (c) and (d) when acquiring the second device information (622) from the second device (412): (c) a process of acquiring the second device information (622) from the multi-function apparatus (400) via a network N1 when the monitoring apparatus U0 is connected to the multi-function apparatus (400) via the network N1; and (d) a process of acquiring the second device information (622) via a second device driver (312) for controlling the second device (412) when the monitoring apparatus U0 is connected to the multi-function apparatus (400) via a Universal Serial Bus (USB) interface.

When the multi-function apparatus (400) is connected to a computer via the USB interface, the first device (411) and the second device (412) in an identical multi-function apparatus (400) may be identified as different devices depending on the specification of the OS of the computer. Thus, when the monitoring apparatus U0 is connected to the multi-function apparatus (400) via the USB interface, the second device information (622) is preferably acquired via the second device driver (312). In contrast, when the multi-function apparatus (400) is connected to a computer via the network N1, the multi-function apparatus (400) including the first device (411) and the second device (412) is often identified as one device. Thus, when the monitoring apparatus U0 is connected to the multi-function apparatus (400) via the network N1, the second device information (622) is preferably acquired from the multi-function apparatus (400) via the network N1.

Thus, the present aspect can provide a preferred example of a reduction in the power consumption by the multi-function apparatus.

Eleventh Aspect

Here, the monitoring method according to one aspect of the present technique includes a status information acquisition step ST1 corresponding to the status information acquisition unit U1 and a device information acquisition step ST2 corresponding to the device information acquisition unit U2. The present aspect enables providing of a method enabling a reduction in power consumption by a multi-function apparatus. The monitoring method may include an association information generation step ST3 corresponding to the association information generation unit U3, a charge information collection step ST4 corresponding to the charge information collection unit U4, and a reception step ST5 corresponding to the reception unit U5.

Twelfth Aspect

Moreover, the monitoring program according to one aspect of the present technique causes a computer to execute a status information acquisition function FU1 corresponding to the status information acquisition unit U1 and a device information acquisition function FU2 corresponding to the device information acquisition unit U2. The present aspect enables providing of a monitoring program enabling a reduction in power consumption by a multi-function apparatus. The monitoring program may cause a computer to execute an association information generation function FU3 corresponding to the association information generation unit U3, a charge information collection function FU4 corresponding to a charge information collection unit U4, and a reception function FU5 corresponding to the reception unit U5.

Moreover, the present technique is applicable, for example, to a management system including a monitoring apparatus, a method for controlling the monitoring apparatus, a method for controlling the management system, a control program of the monitoring apparatus, a control program of the management system, and a computer-readable medium storing the monitoring program and/or the control program. The monitoring apparatus and/or the management system may include a plurality of distributed components.

(2) Specific Example of Monitoring Apparatus

FIG. 1 schematically shows a management system SY1 including the monitoring apparatus U0. The management system SY1 includes a management server 200 as a server computer, clients 300, 330, 340, . . . as client computers, multi-function devices 410 and 420 which are examples of the multi-function apparatus, a printer 431 which is a single-function device, and the like. Note that the multi-function devices 410 and 420 are collectively referred to as multi-function devices 400. An installation area of the clients 300, 330, 340, . . . , the multi-function apparatus 400, and the printer 431 is expected to be a relatively small area, such as a business establishment, a branch, or the like but may be distributed areas. The installation site of the management server 200 is expected to be a site, such as a site outside the business establishment or a site outside the branch, relatively remote from the clients and the like but may be included in an area where the clients and the like are installed.

In FIG. 1, the management server 200, the clients 300, 330, 340, . . . , the multi-function device 420, and the printer 431 are connected to the network N1 to be able to input and output information to and from each other. As the network N1, the Internet, a Local Area Network (LAN), and a network connecting LANs via a Wide Area Network (WAN), or the like may be used, and examples of the network N1 may include a wireless network such as a wireless LAN. The client 300 and the multi-function device 410 are connected to each other via a USB interface to be able to input and output information to and from each other. The USB interface is an example of a universal serial interface, and USB-compatible apparatuses can be connected to each other via a USB cable, but the cable connection may be replaced with a wireless connection. Due to the specification of the USB, the client 300 and the multi-function device 410 are installed in sites relatively close to each other. Note that the number of clients included in the management system is not particularly limited and may be one. The number of multi-function devices included in the management system is not particularly limited and may be one. The number of single-function devices included in the management system may be two or more, or the management system does not have to include the single-function device. The management server 200 may include a plurality of distributed computers.

The management server 200 shown in FIG. 1 includes a clock circuit 201, a Central Processing Unit (CPU) 202, Non-Volatile Memory 203, Random Access Memory (RAM) 204, a network interface (I/F) 205, a display device which is not shown, an input apparatus (for example, a pointing device or a keyboard) which is not shown, and the like. These components 201 to 205 and the like are connected to each other to be able to input and output data to and from each other. The nonvolatile memory 203 stores a management program P1 which is to be developed in the RAM 204, association information 500 associating the first device (printer 421) and the second device (scanner 422), a monitoring target list L1 which is a list of devices registered and connected to the management system SY1, and the like. As the nonvolatile memory 203, Read Only Memory (ROM), nonvolatile semiconductor memory such as flash memory, a magnetic recording medium such as a hard disk, or the like may be used. The network I/F 205 is connected to the network N1 and performs a process of transmitting and receiving data to and from external devices (for example, the clients 300, 330, 340, . . . , the multi-function device 420, and the printer 431) connected to the network N1.

Note that the management server 200 may include a plurality of devices which are separated from each other but can communicate with each other.

The client 300 shown in FIG. 1 includes a clock circuit 301, a CPU 302, nonvolatile memory 303, RAM 304, a network I/F 305, a USB I/F 306, a display device which is not shown, and an input apparatus which is not shown, and the like. These components 301 to 306 and the like are connected to each other to be able to input and output data to and from each other. The nonvolatile memory 303 stores an intermediate program P2 which is to be developed in the RAM 304, the association information 500, and the like. The intermediate program P2 causes the client 300 to realize an intermediate unit UP2 illustrated in FIG. 3. The management program P1 and the intermediate program P2 are examples of the monitoring program. As the nonvolatile memory 303, ROM, nonvolatile semiconductor memory, a magnetic recording medium, or the like may be used. The network I/F 305 is connected to the network N1 and performs a process of transmitting and receiving data to and from the external devices connected to the network N1. The USB I/F 306 is connected to the multi-function device 410 and performs a process of transmitting and receiving data to and from the multi-function device 410.

Note that the client 300 may include a plurality of devices which are separated from each other but can communicate with each other. Moreover, the configurations of the clients 330, 340, . . . are the same as the configuration of the client 300, and the description thereof is thus omitted.

The multi-function device 410 shown in FIG. 1 includes the printer 411 which is an example of a printing apparatus and the first device, the scanner 412 which is an example of an image scanner and the second device, a facsimile 413, and the like and is connected to the client 300 via a USB interface. The multi-function device 420 shown in FIG. 1 includes a printer 421, a scanner 422, a facsimile 423, and the like and is connected to the network N1. To this network N1, the printer 431 is also connected. The printer 431 may be a stationary printing apparatus or a portable printing apparatus.

The printers 411, 421, 431, . . . are printing apparatuses configured to perform printing on a print substrate such as a copy paper sheet. The printers 411, 421, 431, . . . form images corresponding, for example, to image data on the print substrate with ink (which is an example of a coloring material). The printers 411, 421, 431, . . . of the present specific example are ink jet printers, but an electrophotographic printer such as a laser printer may be used as the printers 411, 421, 431, . . . . Thus, a coloring material which is fixed to the print substrate may be toner or the like.

The scanners 412 and 422 are image scanners configured to read document images. The scanners 412 and 422 read document images, for example, by irradiating document with light from a light source to form corresponding image data. As the scanners 412 and 422, flatbed scanners in which a document is placed between a platen glass and a document cover, scanners with document feeders, or the like may be used.

The facsimiles 413 and 423 are connected to telephone lines which are not shown, and communicate with another facsimile connected to the telephone lines.

Figure 2:
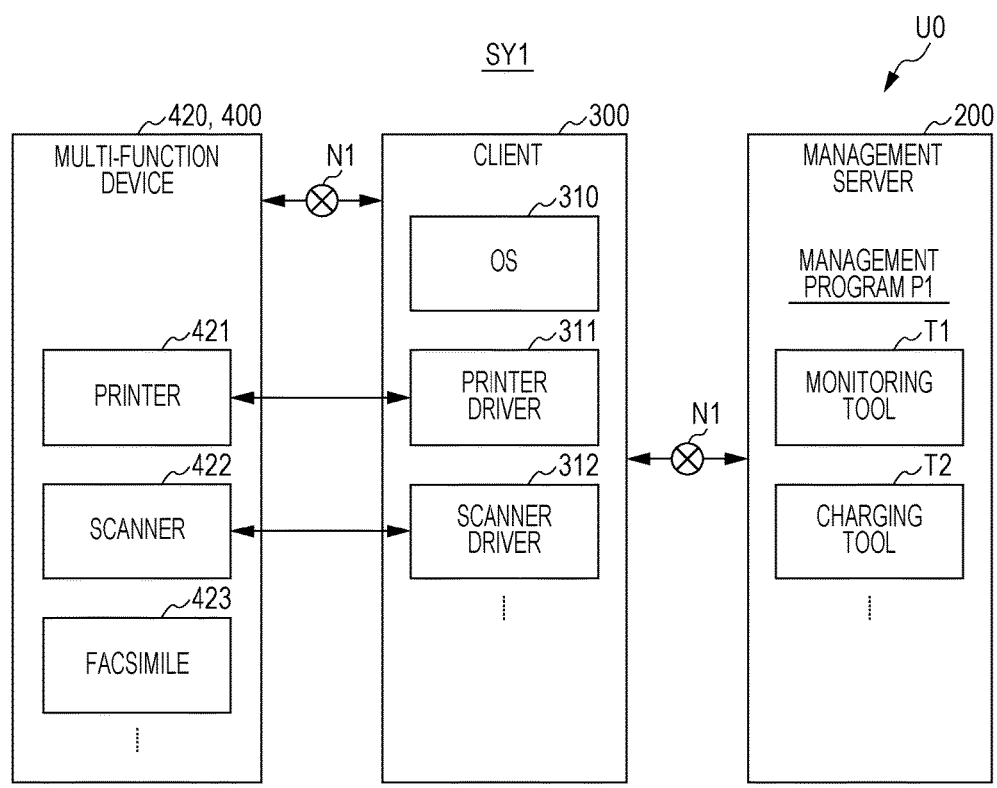
FIG. 2 is a block diagram schematically illustrating an example of the management system including the monitoring apparatus to which a multi-function apparatus is connected via a network.

FIG. 2 schematically shows the management system SY1 including the monitoring apparatus U0 to which the multi-function device 420 is connected via a network. The management server 200 of the management system SY1 in this case is compatible with the monitoring apparatus U0. The multi-function device 420 connected to the network N1 is identified as a single device by the client 300.

The management server 200 shown in FIG. 2 is realized by the management program P1 including a monitoring tool T1, a charging tool T2, and the like. The monitoring tool T1 is a program for collecting, from a device (the multi-function device 400, the printer 431, or the like) device information regarding the device and being a collection target to perform a monitoring process. The charging tool T2 is a program for collecting charge information regarding charge to the use of the device to perform an accounting process.

The client 300 shown in FIG. 2 executes programs of an operating system (OS) 310, a printer driver 311, a scanner driver 312, and the like. The printer driver 311 causes the client 300 to realize a function of controlling operation of the printer 421. The printer driver 312 causes the client 300 to realize a function of controlling operation of the scanner 422.

FIG. 3 schematically shows the management system SY1 including the monitoring apparatus U0 to which the multi-function device 410 is connected via a USB interface. In this case, the management server 200 on which the management program P1 is to be executed and the client 300 which executes the intermediate program P2 correspond to the monitoring apparatus U0. The printer driver 311 shown in FIG. 3 is an example of the first device driver which controls operation of the printer 411. The scanner driver 312 shown in FIG. 3 is an example of the second device driver which controls operation of the scanner 412.

Here, for example, when the printer 411 and the scanner 412 of the multi-function device 410 are controlled by different control apparatuses, the multi-function device 410 and the client 300 are assumed to be connected via a USB. In this case, the OS 310 of the client 300 identifies the printer 411 and the scanner 412 as different devices, and a handler is generated for each of the printer 411 and the scanner 412. Here, a printer device handler 321 is generated for the printer 411, and a scanner device handler 322 is generated for the scanner 412.

In response to a request for reading of status information denoting a power supply state and the like to the devices, only some of control apparatuses which independently control devices (411, 412, 413, . . . ) included in the multi-function device 410 may be able to read the status information while the devices remain in sleep mode. However, for devices whose sleep mode is terminated by the reading of status information, it is not known whether or not the devices are in sleep mode before the status information is acquired, and therefore, the sleep mode may be terminated by the reading of status information. Here, when devices which remain in sleep mode even in the case of the reading of the status information are in sleep mode, the devices whose sleep mode is terminated by the reading of status information are also highly possibly in sleep mode. Thus, in the specific example, status information is read from a device which remain in sleep mode even in the case of the reading of the status information, and only when this device is not in sleep mode, device information for the monitoring process is read out of each device. When a device whose sleep mode is terminated by the reading of status information is highly possibly in sleep mode, the reading of status information is not performed. In this way, termination of sleep mode by the reading of status information is reduced, and the power consumption by the multi-function device is reduced.

In the specific example, the printer 411 and the scanner 412 in sleep mode operate as shown in FIG. 3. The printer 411 shown in FIG. 3 terminates sleep mode when the device information needs to be read out from the printer 411 in sleep mode, whereas the printer 411 remains in sleep mode when the status information needs to be read out from the printer 411 in sleep mode. The scanner 412 shown in FIG. 3 terminates sleep mode when the status information needs to be read out from the scanner 412 in sleep mode, whereas the scanner 412 remains in sleep mode when the device information needs to be read out from the scanner 412 in sleep mode.

However, as described above, since the OS 310 detects the printer 411 and the scanner 412 as independent devices, association of the printer 411 and the scanner 412 in an identical multi-function device 410 with each other is necessary. This association may be performed by a manager or an operator of the management system SY1 but is preferably automatically performed. In the specific example, when the multi-function device 410 and the client 300 are connected via an USB, a process of associating the printer 411 and the scanner 412 with each other is performed by executing an intermediate program P2. This association process can be a process including acquiring printer information which is the device information of the printer 411 from the printer 411, acquiring scanner information which is the device information of the scanner 412 from the scanner 412, and generating association information 500 associating the printer 411 and the scanner 412 with each other when the printer information and the scanner information include the same serial numbers 510 (example of the specific information). In the specific example, the association information 500 including the serial numbers 510 is transmitted to the management server 200 over the network N1, which enables the management program P1 to use the association information 500.

Figure 4:
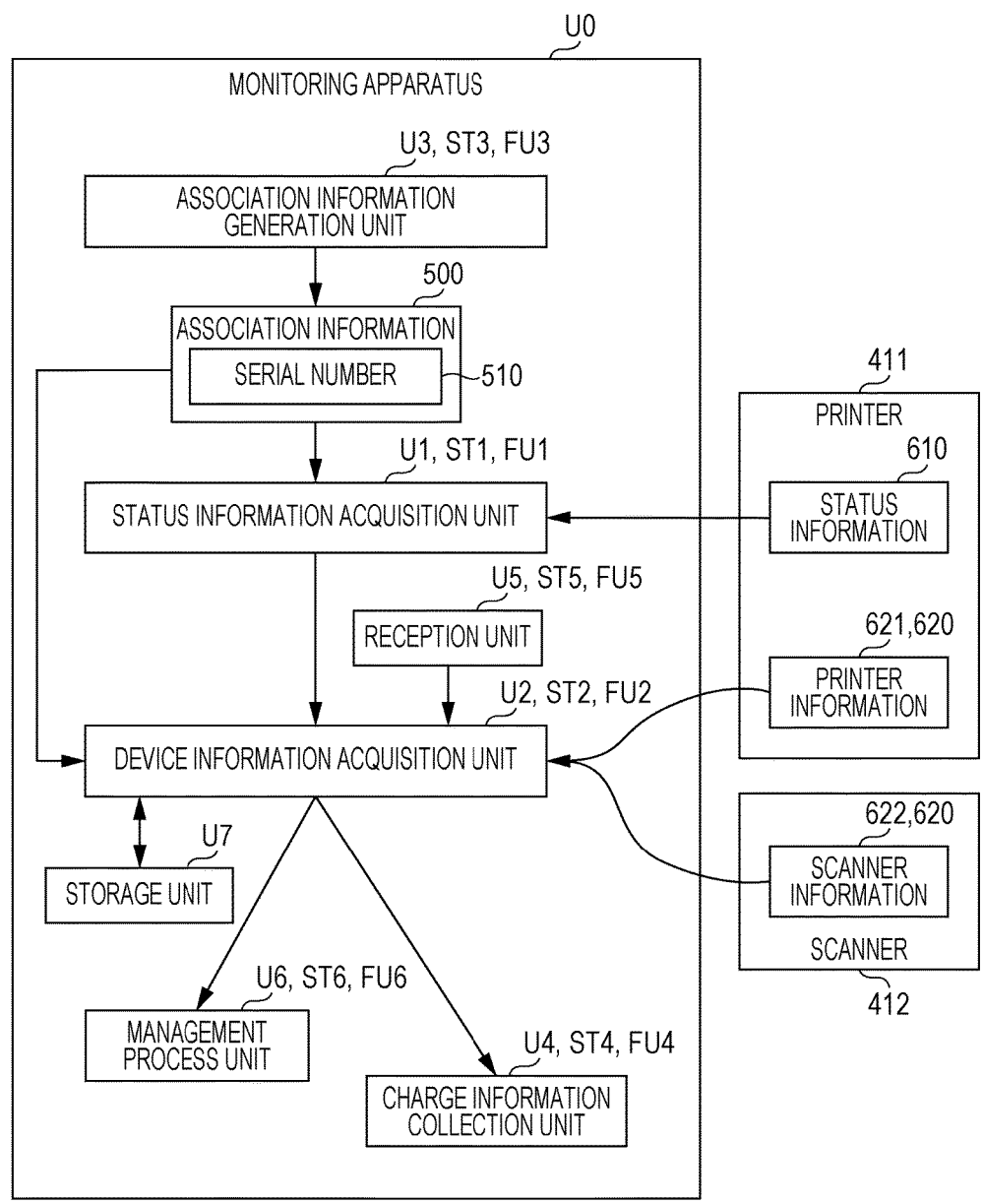
FIG. 4 is a block diagram schematically illustrating an example of the monitoring apparatus.
Figure 5:
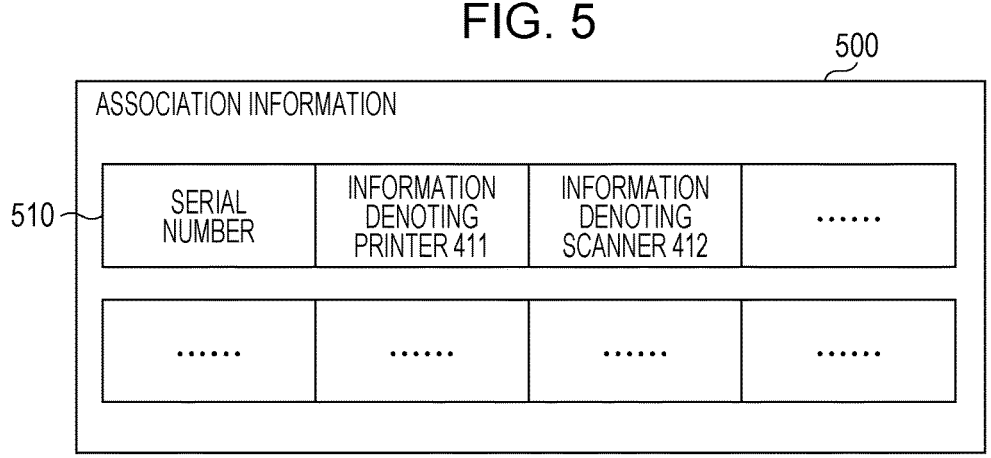
FIG. 5 is a view schematically illustrating a configuration example of association information.

FIG. 4 schematically shows the monitoring apparatus U0. The monitoring apparatus U0 of the present specific example includes the management server 200 configured to run the management program P1 and the client 300 configured to run the intermediate program P2. The monitoring apparatus U0 shown in FIG. 4 includes the status information acquisition unit U1, the device information acquisition unit U2, the association information generation unit U3, a charge information collection unit U4, the reception unit U5, a management process unit U6, and the storage unit U7. The monitoring method performed by the monitoring apparatus U0 includes the status information acquisition step ST1, the device information acquisition step ST2, the association information generation step ST3, a charge information collection step ST4, the reception step ST5, and a management process step ST6. The management programs P1 and P2 cause a computer to realize the status information acquisition function FU1, the device information acquisition function FU2, the association information generation function FU3, a charge information collection function FU4, the reception function FU5, and a management process function FU6.

First, components of the monitoring apparatus U0 are briefly described.

The association information 500 at least associating the printer 411 and the scanner 412 with each other is generated by the association information generation unit U3. The association information generation unit U3 individually acquires the serial numbers 510 from the plurality of devices (411, 412, . . . ) of the multi-function device 410 and specifies the devices included in the multi-function device 410 on the basis of the serial numbers 510 to generate the association information 500. The association information 500 shown in FIG. 5 includes information associating information denoting devices (411, 412, . . . ) from which the same serial numbers 510 have been acquired with the serial number 510. Note that when other different devices having the same serial numbers are detected, the association information 500 also includes information associating information denoting the devices from which the serial numbers have been acquired with the serial number. The association information 500 is stored in a storage unit (for example, nonvolatile memory 303) of the client 300 and is transmitted to the management server 200 over the network N1 to be stored in a storage unit (for example, nonvolatile memory 203) of the management server 200.

The status information acquisition unit U1 refers to the association information 500 to acquire, at a monitoring timing of the multi-function device 410, from the printer 411, status information 610 representing the state of the printer 411 which is the first device. The status information 610 illustrated in FIG. 6 includes statuses representing whether the power supply state to the printer 411 corresponds to the normal mode (a state which is not a power-saving mode) or sleep mode (power-saving mode), whether the printer 411 is performing printing or in an idle mode (is not performing printing), whether the firmware of the printer 411 is being updated or on standby (in a state in which the firmware is not being updated), and the like. Note that the specification example does not use the status information of a device such as the scanner 412 other than the printer 411 of the devices (411, 412, . . . ).

The device information acquisition unit U2 acquires, for the monitoring process performed at a monitoring timing, the printer information 621 from the printer 411 and the scanner information 622 which is the second device information from the scanner 412 which is the second device when the status information 610 of the printer 411 acquired by the status information acquisition unit U1 is not information denoting the sleep mode but is information denoting that the printer information 621 which is the first device information can be output from the printer 411. Note that the printer information 621 and the scanner information 622 are collectively referred to as device information 620. Moreover, the device information acquisition unit U2 stores the printer information 621 and the scanner information 622 which have been acquired in the storage unit U7 (for example, the nonvolatile memory 203 and 303).

Figure 7:
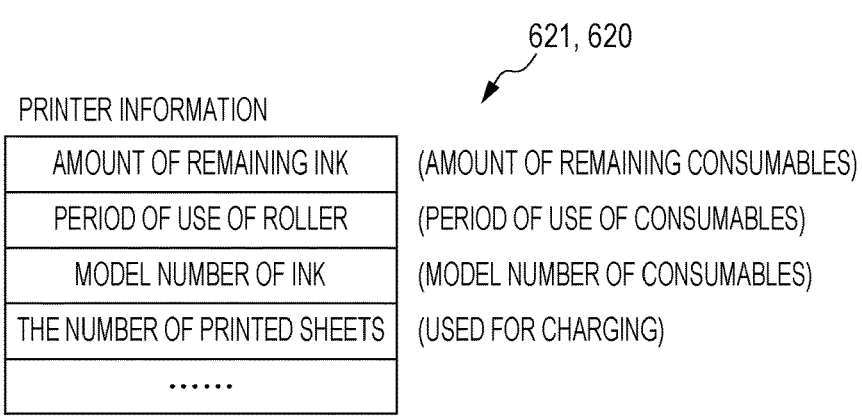
FIG. 7 is a view schematically illustrating a configuration example of device information.

FIG. 7 schematically shows the configuration of the printer information 621 which is a collection target. The printer information 621 illustrated in FIG. 7 includes the amount of remaining consumables such as the amount of remaining ink, a period of use of the consumables such as a period of use of a roller such as a sheet feeder, the model number of the consumables such as the model number of the ink, information for charge amount calculation such as the number of printed sheets, and the like. Among such pieces of information, the amount of remaining consumables, the period of use of the consumables, and the number of printed sheets are pieces of information which change depending on the operation of the printer 411. The model number of the consumables is information which does not change depending on the operation of the printer 411. Although not shown, examples of the scanner information 622 which is a collection target include a period of use of consumables, for example, a period of use of a roller for feeding paper and the like, information for charge amount calculation, and the like. Among such pieces of information, the period of use of the consumables is information which changes depending on the operation of the scanner 412.

The charge information collection unit U4 acquires from devices (411, 412, . . . ), the device information 620 for collecting charge information at a charge information collection timing for collecting the charge information regarding use of the multi-function device 410 even when the printer 411 is in sleep mode.

The reception unit U5 receives an instruction from a user to acquire the printer information 621. When this instruction is received, the device information acquisition unit U2 acquires the device information 620 from the device (411, 412, . . . ) even when the printer 411 is in sleep mode.

The management process unit U6 performs a monitoring process, a charge process, and the like.

(3) Example of Process Performed by Monitoring Apparatus

Next, an example of the process performed by the monitoring apparatus U0 will be described. Note that the management server 200 and the client 300 concurrently perform a plurality of processes by multitasking. The processes, for example, the processes shown in FIGS. 8 to 15 for realizing the present technique are not necessarily performed by the CPU but may be performed by an electronic component [e.g., an Application Specific Integrated Circuit (ASIC)]. Moreover, the processes for realizing the present technique may be performed by a plurality of CPUs in a distributed manner or may be performed by cooperation of the CPU and an electronic component (for example, an ASIC).

FIG. 8 shows an example of an association information generation process performed by the management server 200 and the client 300. This process corresponds to the association information generation unit U3, the association information generation function FU3, and the association information generation step ST3.

When the association information generation process is started, the management server 200 refers to the monitoring target list L1 to search for an unregistered device connected to the management system SY1 (step S102) and repeats the process in step S102 until an unregistered device is detected (step S104). In the following description, the term "step" is omitted. As illustrated in FIG. 1, the device may be connected to the network N1 or may be connected to the client 300 via a USB interface. Thus, the management server 200 searches for an unregistered device over the network N1 and searches for an unregistered device connected to the client 300 over a USB via the intermediate unit UP2 of the client 300.

When an unregistered device is detected, the management server 200 acquires device information from the unregistered device over the network N1 or the intermediate unit UP2 (S106) and adds the device to the monitoring target list L1 (S108). Information representing whether the added device is connected to the network N1 or is connected to the client 300 via a USB interface is also stored in the monitoring target list L1 in association with the device. Here, when unregistered devices (411, 412, . . . ) are connected to the client 300 via a USB, the intermediate unit UP2 acquires device information including the serial number 510 which is the specific information of the device individually from the devices (411, 412, . . . ). The intermediate unit UP2 may acquire the device information including the serial number 510 from the device drivers (311, 312, . . . ). Next, the intermediate unit UP2 determine, on the basis of the serial number 510, whether or not the added devices include a plurality of devices assigned with the same serial number 510 (S110). If a condition that the added devices include a plurality of devices assigned with the same serial number 510 is not satisfied, the intermediate unit UP2 transmits to the management server 200 information denoting that the condition is not satisfied. The process of the management server 200 which has received the information denoting that the condition is not satisfied returns to S102.

If the added devices include a plurality of devices to which the same serial numbers 510 are assigned, the intermediate unit UP2 generates and stores, on the basis of the serial numbers 510, association information 500 while the devices (411, 412, . . . ) to which the serial numbers 510 are assigned are associated with each other, and the intermediate unit UP2 transmits the association information 500 to the management server 200 (S112). The management server 200 which has received the association information 500 stores the association information 500, and the process of the management server 200 returns to S102. In this way, the intermediate unit UP2 determines the printer 411 and the scanner 412 included in the multi-function device 410 on the basis of the serial numbers 510 and generates the association information 500 associating the printer 411 and the scanner 412 with each other.

Figure 12:
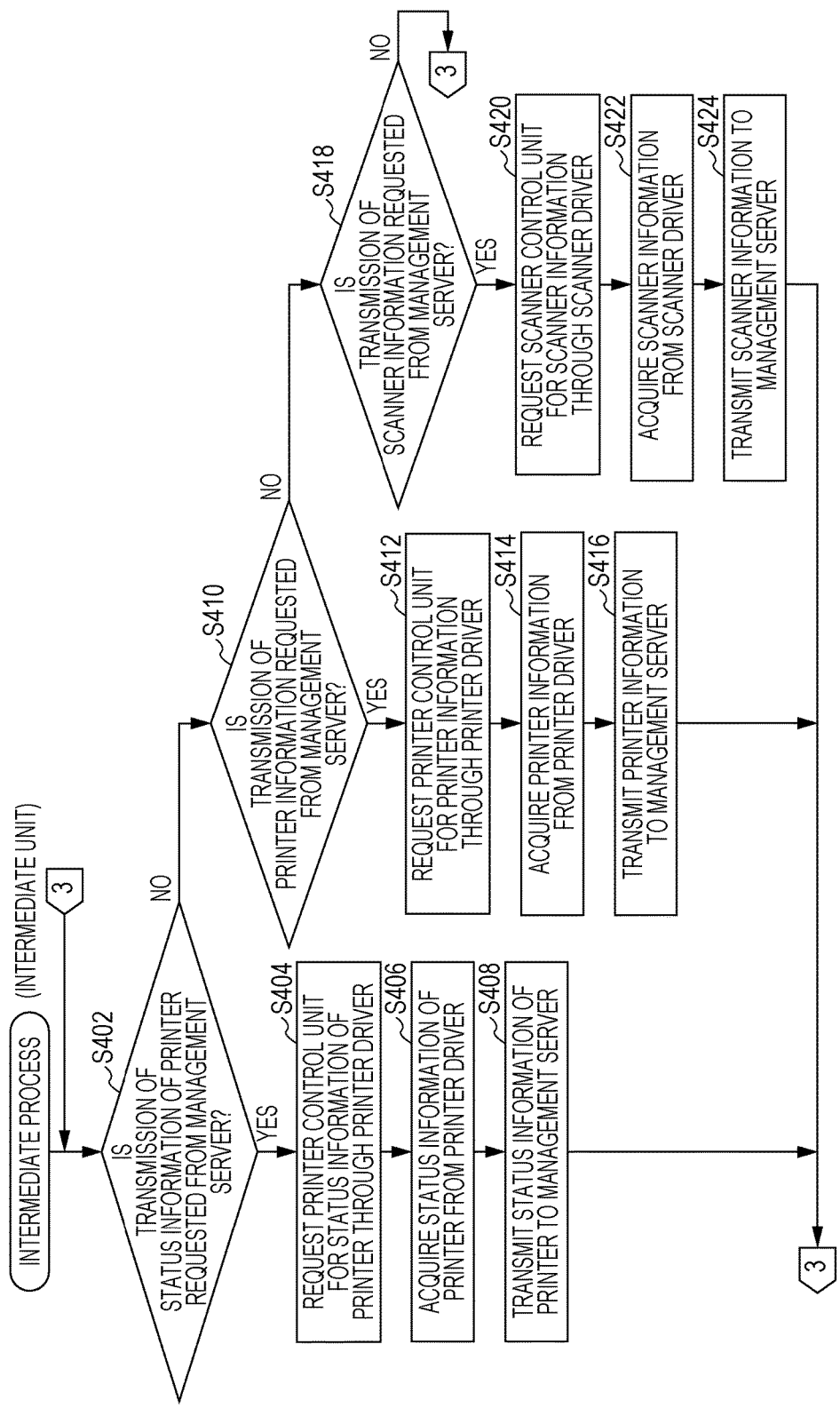
FIG. 12 is a flowchart illustrating an example of an intermediate process performed by an intermediate unit.

FIGS. 9 to 11 show an example of a process performed by the management server 200. FIG. 12 shows an intermediate process performed by the intermediate unit UP2 of the client 300. For the sake of description, the intermediate process of FIG. 12 will first be described. Note that the arrow toward the reference number 3 means that the process returns to S402.

When the intermediate process is started, the intermediate unit UP2 determines whether or not transmission of the status information 610 of the printer 411 is requested from the management server 200 (S402). If the transmission of the status information 610 is requested, the intermediate unit UP2 requests the control unit of the printer 411 for the status information 610 of the printer 411 through the printer driver 311 (S404). The control unit of the printer 411 which has received the request for the status information 610 over a USB interface transmits the status information 610 to the client 300 over the USB interface. The client 300 receives the status information 610 by using a function realized by the printer driver 311. The intermediate unit UP2 acquires the status information 610 of the printer 411 from the printer 411 via the printer driver 311 (S406) and transmits the status information 610 to the management server 200 over the network N1 (S408), and the process returns to S402.

If the transmission of the status information 610 is not requested, the intermediate unit UP2 determines whether or not transmission of the printer information 621 is requested from the management server 200 (S410). If the transmission of the printer information 621 is requested, the intermediate unit UP2 requests the control unit of the printer 411 for the printer information 621 of the printer 411 through the printer driver 311 (S412). The control unit of the printer 411 which has received the request for the printer information 621 over a USB interface transmits the printer information 621 to the client 300 over the USB interface. The client 300 receives the printer information 621 by using a function realized by the printer driver 311. The intermediate unit UP2 acquires the printer information 621 from the printer 411 via the printer driver 311 (S414) and transmits the printer information 621 to the management server 200 over the network N1 (S416), and the process returns to S402.

Thus, when the monitoring apparatus U0 is connected to the multi-function device 410 via the USB interface, a process of acquiring the printer information 621 from the printer 411 via the printer driver 311 is performed.

If the transmission of the printer information 621 is not requested, the intermediate unit UP2 determines whether or not transmission of the scanner information 622 is requested from the management server 200 (S418). If the transmission of the scanner information 622 is requested, the intermediate unit UP2 requests the control unit of the scanner 412 for the scanner information 622 through the scanner driver 312 (S420). The control unit of the printer 412 which has received the request for the scanner information 622 over a USB interface transmits the scanner information 622 to the client 300 over the USB interface. The client 300 receives the scanner information 622 by using a function realized by the scanner driver 312. The intermediate unit UP2 acquires the scanner information 622 from the scanner 412 via the scanner driver 312 (S422) and transmits the scanner information 622 to the management server 200 over the network N1 (S424), and the process returns to S402.

Thus, when the monitoring apparatus U0 is connected to the multi-function device 410 via the USB interface, a process of acquiring the scanner information 622 from the scanner 412 via the scanner driver 312 is performed. Note that if the transmission of the scanner information 622 is not requested, the process of the intermediate unit UP2 returns to S402.

FIGS. 9 and 10 show an example of a main process performed by the management server 200. Note that the arrow toward the reference number 1 means that the process returns to S202 of FIG. 9, and the arrow toward the reference number 2 means that the process proceeds to S226 of FIG. 10. Here, S204 to S206 correspond to the charge information collection unit U4, the charge information collection function FU4, and the charge information collection step ST4. S208, S216 to S218 correspond to the status information acquisition unit U1, the status information acquisition function FU1, and the status information acquisition step ST1. The step S210, S212, S220 to S242 correspond to the device information acquisition unit U2, the device information acquisition function FU2, and the device information acquisition step ST2.

When the main process is started, the management server 200 sets a monitoring target device from a list of devices included in the monitoring target list L1 (S202). First, the management server 200 determines whether or not the time of the clock circuit 201 corresponds to the charge information collection timing (S204). For example, when charging is performed at the end of the month, a predetermined time on the last day of every month is the charge information collection timing. When a condition that the time of the clock circuit 201 corresponds to the charge information collection timing is satisfied, the management server 200 performs a charge information collection process which will be described later (S206), and the process of the management server proceeds to S208.

In S208, the management server 200 determines whether or not the time of the clock circuit 201 corresponds to the monitoring timing. For example, when monitoring is performed at 10 a.m. daily, 10 a.m. is the monitoring timing daily. If a condition that the time of the clock circuit 201 corresponds to the monitoring timing is not satisfied, the process of the management server 200 returns to S202. If the condition is satisfied, the management server 200 branches the process depending on connection systems, that is, whether the monitoring target device is connected via a network or a USB (S210). When the monitoring target device is connected to the network N1, the management server 200 acquires Management Information Base (MIB) information of the monitoring target device through a network control unit of the monitoring target device (S212) and performs a monitoring process (for example, the monitoring process shown in FIG. 13) which is not shown but which will be described later. Then, the process of the management server 200 returns to S202. For example, when the monitoring target device is the multi-function device 420 including the printer 421, the MIB information includes the printer information (621). Thus, when the monitoring server 200 is connected to the multi-function apparatus 420 via the network N1, a process of acquiring the printer information (621) from the multi-function apparatus 420 via the network N1 is performed. Moreover, when the monitoring target device is the multi-function device 420 including the scanner 422, the MIB information includes the scanner information 622. Thus, when the monitoring server 200 is connected to the multi-function apparatus 420 via the network N1, a process of acquiring the scanner information 622 from the multi-function apparatus 420 via the network N1 is performed.

When the monitoring target device is connected to the client 300 via a USB interface, the management server 200 refers to the association information 500 and determines whether or not a device to which the same serial number 510 as that of the monitoring target device is assigned exists (S214). If no device to which the same serial number 510 is assigned exists, the management server 200 acquires the device information from the monitoring target device through the intermediate unit UP2, not shown in the figure, and performs a monitoring process (for example, the monitoring process shown in FIG. 13). Then, the process of the management server 200 returns to S202.

If a device to which the same serial number 510 is assigned exists, the management server 200 requests the control unit of the printer 411 for the status information 610 through the intermediate unit UP2 of the client 300 (S216). As illustrated in FIG. 12, the intermediate unit UP2 which has received the request for the status information 610 acquires the status information 610 from the printer 411. When the printer 411 is in sleep mode, the printer 411 remains in the sleep mode. The management server 200 acquires the status information 610 of the printer 411 from the intermediate unit UP2 (S218).

The management server 200 which has acquired the status information 610 determines, on the basis of the status information 610, whether or not the power supply state of the printer 411 corresponds to sleep mode (S220). If the power supply state corresponds to sleep mode, the management server 200 acquires previously stored printer information (S222), acquires previously stored scanner information (S224), which will be described later in detail, and the management server 200 performs a monitoring process (for example, the monitoring process shown in FIG. 13) which is not shown but will be described later. Then, the process returns to S202. As described above, when the status information 610 is information denoting that the printer 411 is in sleep mode, acquisition of the scanner information 622 from the scanner 412 is not performed.

If the printer 411 is not in sleep mode, the management server 200 determines, on the basis of the status information 610, whether or not the printer 411 can output the printer information 621 (S226 of FIG. 10). In the status information 610 shown in FIG. 6, when the operation state corresponds to printing, or the update state corresponds to updating, the printer information 621 cannot be output from the printer 411. In this case, the management server 200 acquires the previously stored printer information (S228), acquires the previously stored scanner information (S230), which will be described later in detail, and the management server 200 performs a monitoring process (for example, the monitoring process shown in FIG. 13) which is not shown but will be described later. Then, the process returns to S202 of FIG. 9.

Figure 6:
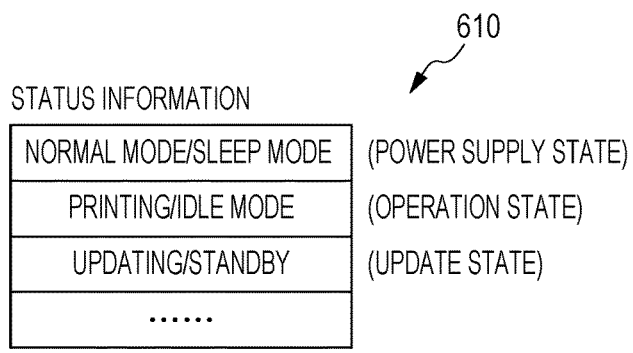
FIG. 6 is a view schematically illustrating a configuration example of status information.

In contrast, in the status information 610 shown in FIG. 6, when the operation state corresponds to an idle mode, and the update state corresponds to standby, the printer 411 cannot output the printer information 621. In this case, the management server 200 requests the control unit of the printer 411 for the printer information 621 through the intermediate unit UP2 of the client 300 (S232). As illustrated in FIG. 12, the intermediate unit UP2 which has received the request for the printer information 621 acquires the printer information 621 from the printer 411. At this time, the power supply state of the printer 411 remains to correspond to a normal mode. The management server 200 acquires the printer information 621 from the intermediate unit UP2 (S234) and stores the printer information 621 in nonvolatile memory 203 (S236). Moreover, the management server 200 requests the control unit of the scanner 412 for the scanner information 622 through the intermediate unit UP2 of the client 300 (S238). As illustrated in FIG. 12, the intermediate unit UP2 which has received the request for the scanner information 622 acquires the scanner information 622 from the scanner 412. At this time, the printer 411 is not in sleep mode, and therefore, the possibility that the scanner 412 switches from sleep mode to a normal mode is low. The management server 200 acquires the scanner information 622 from the intermediate unit UP2 (S240) and stores the scanner information 622 in the nonvolatile memory 203 (S242). Then, the management server 200 performs a monitoring process (for example, the monitoring process shown in FIG. 13) which is not shown but will be described later. Then, the process of the management server 200 returns to S202 of FIG. 9.

The processes in S232 to S242 are repeatedly performed, thereby repeatedly storing new device information 620 acquired from the devices (411, 412). Thus, in the processes in S222 to S224 of FIG. 9 performed when the status information 610 is information denoting sleep mode, the printer information 621 and the scanner information 622 which have been most recently stored in the nonvolatile memory 203 are to be acquired. Thus, the printer information 621 and the scanner information 622 which have been stored most recently are used for the monitoring process. Moreover, also in the processes in S228 to S230 of FIG. 10 performed when the status information 610 is information denoting that the printer 411 cannot output the printer information 621, the printer information 621 and the scanner information 622 which have been most recently stored in the nonvolatile memory 203 are to be acquired. Thus, the printer information 621 and the scanner information 622 which have been most recently stored are used for the monitoring process.

FIG. 11 shows the charge information collection process performed in S206 of FIG. 9. This process corresponds to the charge information collection unit U4, the charge information collection function FU4, and the charge information collection step ST4.

When the charge information collection process is started, the management server 200 branches the process depending on connection systems, that is, whether the monitoring target device is connected via a network or a USB (S302). When the monitoring target device is connected to the network N1, the management server 200 acquires MIB information of the monitoring target device through a network control unit of the monitoring target device (S304) and performs a charge process (for example, the charge process shown in FIG. 14) which is not shown but which will be described later. Then, the charging information collection information is terminated. For example, when the monitoring target device is the multi-function device 420 including the printer 421 and the scanner 422, the MIB information includes the printer information (621) and the scanner information (622).

When the monitoring target device is connected to the client 300 via the USB interface, the management server 200 requests the control unit of the printer 411 for the status information 610 through the intermediate unit UP2 of the client 300 (S306). As illustrated in FIG. 12, the intermediate unit UP2 acquires the status information 610 from the printer 411. The monitoring server 200 acquires the status information 610 of the printer 411 from the intermediate unit UP2 (S308) and determines, on the basis of the status information 610, whether or not the printer 411 can output the printer information 621 (S310). For example, when the operation state corresponds to printing, or the update state corresponds to updating, the printer 411 cannot output the printer information 621. In this case, the process of the management server 200 returns to S302. The process may return to S306.

In contrast, if the printer 411 can output from the printer information 621, the management server 200 requests the control unit of the printer 411 for the printer information 621 through the intermediate unit UP2 of the client 300 (S312). As illustrated in FIG. 12, the intermediate unit UP2 acquires the printer information 621 from the printer 411. The management server 200 acquires the printer information 621 from the intermediate unit UP2 (S314) and stores the printer information 621 in nonvolatile memory 203 (S316). Moreover, the management server 200 requests the control unit of the scanner 412 for the scanner information 622 through the intermediate unit UP2 of the client 300 (S318). As illustrated in FIG. 12, the intermediate unit UP2 acquires the scanner information 622 from the scanner 412. The management server 200 acquires the scanner information 622 from the intermediate unit UP2 (S320), stores the scanner information 622 in the nonvolatile memory 203 (S322), and performs a charge process (for example, the charge process shown in FIG. 14) which is not shown but will be described later. Then, the charging information collection process is terminated.

As described above, at the charge information collection timing, a process of acquiring the device information (621, 622) for collecting charge information from the device (411, 412) is performed regardless of whether or not the status information 610 is information denoting sleep mode.

Note that when the scanner information 622 is not used for the charge amount calculation, the scanner information 622 is not obtained, and only the printer information 621 may be obtained. Alternatively, when the printer information 621 is not used for the charge amount calculation, the printer information 621 is not obtained, and only the scanner information 622 may be obtained.

Figure 13:
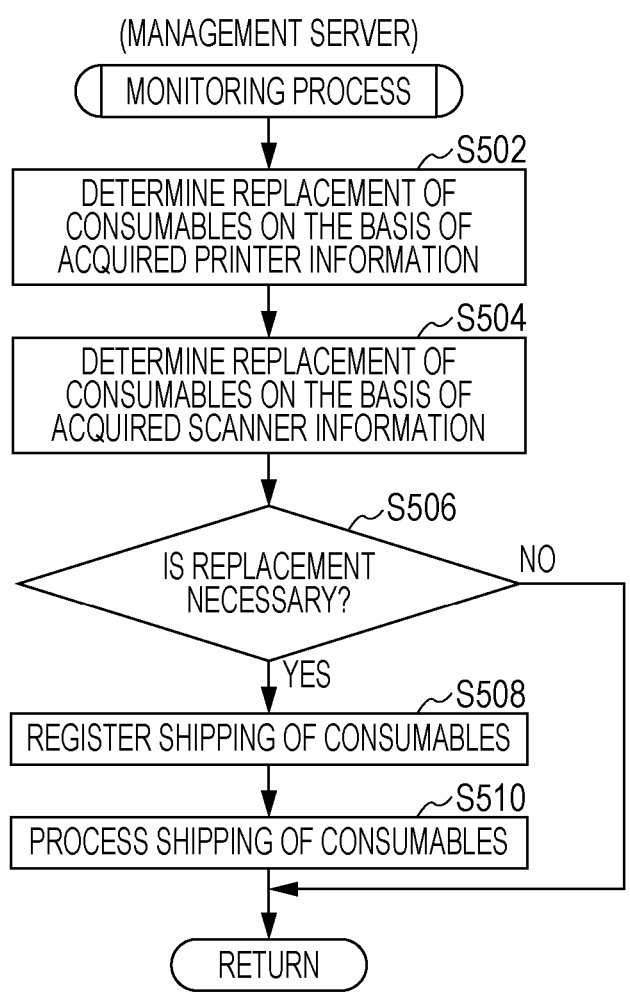
FIG. 13 is a flowchart illustrating an example of a monitoring process performed on the monitoring server.

FIG. 13 shows an example of the monitoring process performed after S212, S224, S230, S242, and the like of the main process shown in FIGS. 9 and 10. This process corresponds to the management process unit U6, the management process function FU6, and the management process step ST6.

When the monitoring process is started, the management server 200 determines, on the basis of the printer information 621 (including the printer information included in the MIB information) acquired in the main process, whether or not the consumables have to be replaced (S502). For example, when the amount of remaining ink represented by the printer information 621 is smaller than a prescribed threshold value, it can be determined that replacement is necessary, whereas when the amount of remaining ink is larger than or equal to the threshold value, it can be determined that the replacement is not necessary. Determinations are made in a similar manner as to the amount of remaining consumables other than the ink, the period of use of the consumables, and the like.

Moreover, the management server 200 determines whether or not the consumables have to be replaced on the basis of the scanner information 622 (including scanner information included in the MIB information) which has been acquired in the main process (S504). For example, when the period of use of a sheet feeding roller denoted by the scanner information 622 exceeds the threshold value, it is determined that replacement of the sheet feeding roller is needed, whereas when the period of use is shorter than or equal to the threshold value, it can be determined that the replacement is not needed. Determinations are made in a similar manner as to the period of use and the like of consumables other than the sheet feeding roller.

Then, the management server 200 determines whether or not there is a consumable for which it has been determined in S502 and S504 that replacement is necessary (S506). If there is a consumable for which it has been determined that the replacement is necessary, the management server 200 performs a process of registering shipment of a consumable replacing the consumable for which it has been determined that the replacement is necessary (S508). Then, the management server 200 performs a process of shipping the consumable replacing the consumable for which it has been determined that the replacement is necessary (S510), and the monitoring process is terminated. The process of shipping of the consumable may be, for example, a process of transmitting an electronic mail addressed to an electronic mail address of a sales person in charge, the electronic mail including contents instructing the shipping of the consumable. The sales person in charge who reads the contents displayed by a computer which received the electronic mail may bring the consumable to the installation site of the multi-function device 400 and replenish the multi-function device 400 with the consumables.

Figure 14:
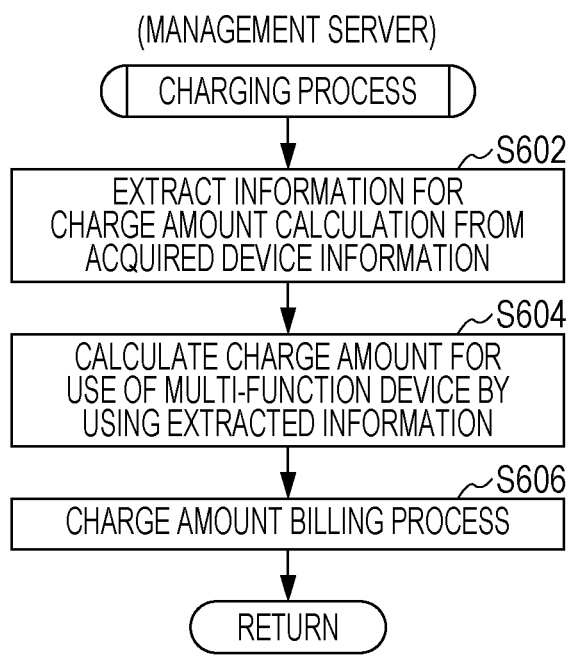
FIG. 14 is a flowchart illustrating an example of a charge process performed on the monitoring server.

FIG. 14 shows an example of the charge process performed after S304 and S322 of the charge information acquisition process shown in FIG. 11.

When the charge process is started, the management server 200 extracts information for charging amount calculation from the device information 620 (including MIB information) acquired in the charge information acquisition process (S602). For example, when the number of color print sheets (referred to as Nc) and the number of monochrome print sheets (referred to as Nm) per month included in the printer information 621 (including printer information included in MIB information) are used in the charge amount calculation, the number of color print sheets Nc and the number of monochrome print Nm may be extracted from the printer information 621.

Next, the management server 200 uses the information extracted in S602 to calculate a charge amount of use of a device such as the multi-function device 400 (S604). For example, when a minimal monthly charge is set to Cmin yen, the unit price per color printing is set to Um yen, and the unit price per monochrome printing is set to Um yen, the charge amount of use of the multi-function device 400 may be determined as a calculated value Uc×Nc+Um×Nm in the case where the calculated value Uc×Nc+Um×Nm is larger than or equal to the minimum charge Cmin, whereas the charge amount of use of the multi-function device 400 may be determined as the minimum charge Cmin in the case where the calculated value Uc×Nc+Um×Nm is smaller than the minimum charge Cmin.

The charge amount may be determined according to contracts in various ways. For example, when the number of scan operations (Nscan) per month included in the scanner information 622 (including scanner information included in the MIB information) is used in the charge amount calculation, the number of scan operations Nscan may be extracted from the scanner information 622, and an amount obtained by multiplying the number of scan operations Nscan by the unit price may be taken into consideration to determine the charge amount. Moreover, the charge amount may be determined in consideration of the cost of the consumables. The charge amount may be determined without taking the number of print sheets into consideration.

Then, the management server 200 performs a process of billing the determined charge amount (S606) and terminates the charge process. The process of billing the charge amount may be, for example, a process of transmitting an electronic mail of contents that a bill of the charge amount is issued to an electronic mail address of a user of the multi-function device 400.

As described above, in the specific embodiment, it is not necessary to acquire the status information from the scanner 412 of the plurality of devices included in the multi-function device 410, wherein sleep mode of the scanner 412 is terminated by reading of status information. This reduces the frequency of termination of sleep mode of the scanner 412. In addition, when the status information 610 acquired from the printer 411 whose sleep mode is not terminated by the reading of status information is information denoting sleep mode, acquisition of the scanner information 622 from the scanner 412 included in an identical multi-function device 410 in which the scanner 412 is included is not performed. When the printer device 411 is in sleep mode, the scanner 412 included in the identical multi-function apparatus 410 in which the printer 411 is included is also highly possibly in sleep mode. Therefore, when the printer 411 is in sleep mode, the acquisition of the scanner information 622 from the scanner 412 is not performed, which reduces the frequency that the scanner 412 terminates sleep mode. Thus, the present specific example enables a reduction in power consumption by the multi-function device.

(4) Variations

Many variations of the invention are possible.

For example, the scanner included in the multi-function apparatus is a device which remains in sleep mode when reading of status information is performed in its sleep mode, and the printer included in the identical multi-function apparatus in which the scanner is included is a device whose sleep mode is terminated by the reading of status information in its sleep mode. In this case, the scanner may be applied to the first device, and the printer may be applied to the second device.

The multi-function apparatus may include three or more devices. In this case, of the three or more devices, one of the devices which remains in sleep mode when reading of status information is performed in its sleep mode is applied to the first device, the present technique is preferably implemented. In this case, of the remaining devices, one of the devices whose sleep mode is terminated by the reading of status information its sleep mode is applied to the second device, the present technique is preferably implemented. Thus, the facsimile 413 included in the multi-function device 410 shown in FIG. 3, storage (memory device), or the like may be applied to the first device or the second device. The storage and the like may be external devices externally connected to a main body of the multi-function apparatus.

The specific information for determining devices included in the multi-function apparatus may be MAC address of the multi-function device, the model name of the multi-function device of the multi-function device, the OS management name set in the multi-function device by a user, and the like other than the serial number.

The first device and the second device are not limited to a plurality of devices included in the multi-function device to which the devices are connected via USBs, and the present technique is applicable to any connection method as long as the plurality of devices are included in the multi-function apparatus. For example, also when the multi-function device is connected to the management system via a network, the present technique is applicable when the plurality of devices included in the multi-function device are individually identified.

In the above-described example, the management server 200 and the client 300 form the monitoring apparatus U0, but the monitoring apparatus may include a single management server or may include a single client.

The above-described processes may be accordingly modified, and for example, the order of the processes may be changed. For example, in the main process of FIG. 10, the processes in S238 to S242 of requesting, acquiring, and storing the scanner information may be performed before any of the processes in S232, S234, S236 of requesting, acquiring, and storing the printer information. Moreover, in the intermediate process in FIG. 12, the determination process in S418 may be performed before determination processes in any of S402 and S410.

Moreover, as a device information manual acquisition process in FIG. 15, the device information may be collected at a point of time at which an instruction from a user is received. This process is performed by the management server 200 but may be performed by the client 300. Here, S702 to S704 correspond to the reception unit U5, the reception function FU5, and the reception step ST5. S706 to S726 correspond to the device information acquisition unit U2, the device information acquisition function FU2, and the device information acquisition step ST2.

When the device information manual acquisition process is started, the management server 200 displays a device information management screen (not shown) on a display device on the basis of the monitoring target list L1 shown in, for example, FIG. 1 (S702). In this state, the management server 200 receives an instruction from a user to acquire the device information 620 (S704). The user may input the instruction to acquire the device information 620 by using an input apparatus (not shown) in the management server 200. Here, when no instruction to acquire the device information 620 is given, the process of the management server 200 returns to S702. When the management server 200 receives the instruction to acquire the device information 620, the management server 200 performs the process in S706 and subsequent processes.

In S706, the management server 200 branches the process depending on connection systems, that is, whether the monitoring target device which has received the instruction to acquire the device information 620 is connected via a network or a USB. When the instruction target device is connected to the network N1, the management server 200 acquires MIB information of a monitoring target device through a network control unit of the monitoring target device (S708) and terminates the device information manual acquisition process.

When the instruction target device is connected to the client 300 via the USB interface, the management server 200 requests the control unit of the printer 411 for the status information 610 through the intermediate unit UP2 of the client 300 (S710). As illustrated in FIG. 12, the intermediate unit UP2 acquires the status information 610 from the printer 411. The monitoring server 200 acquires the status information 610 of the printer 411 from the intermediate unit UP2 (S712), and the management server 200 determines, on the basis of the status information 610, whether or not the printer 411 can output the printer information 621 (S714). For example, when the operation state corresponds to printing, or the update state corresponds to updating, the printer 411 cannot output the printer information 621. In this case, the process of the management server 200 returns to S710.

In contrast, when the printer 411 can output the printer information 621, the same processes as those in S312, S314, S316, S318, S320, and S322 of the charge information collection process of FIG. 11 are respectively performed in S716, S718, S720, S722, S724, S726, and the process proceeds to S702. That is, the management server 200 requests, acquires, and stores the printer information 621 and requests, acquires, and stores the scanner information 622. In this way, when an instruction to acquire the printer information 621 is received, the printer information 621 is acquired from the printer 411 and the scanner information 622 is acquired from the scanner 412 regardless of whether or not the status information 610 of the printer 411 is information denoting sleep mode.

In the case where the device information manual acquisition process described above is performed, when a user instructs to acquire the printer information 621, the device information 620 is acquired from the device (411, 412) even when the printer 411 is in sleep mode. This improves the convenience.

(5) Conclusion

As described above, according to the invention, the various aspects enable providing of a technique and the like enabling a reduction in power consumption by a device. The technique including only components according to independent claim provides the above-described operation and advantages.

Note that the invention also includes a configuration obtained by replacing the configurations disclosed in the above-mentioned examples with each other or changing the combination thereof, a configuration obtained by replacing the configurations disclosed in well-known techniques and the above-mentioned examples with each other or changing the combination thereof, and the like. The invention includes these configurations and the like.

The entire disclosure of Japanese Patent Application No. 2016-199738, filed Oct. 11, 2016 is expressly incorporated by reference herein.

What is claimed is:

1. A monitoring apparatus configured to acquire, from a multi-function apparatus including a first device and a second device, first device information regarding the first device and second device information regarding the second device, the monitoring apparatus further configured to:
   acquire from the first device, at a monitoring timing of the multi-function apparatus, status information denoting a state of the first device; and acquire the first device information from the first device and the second device information from the second device, wherein the monitoring apparatus is further configured to not perform acquisition of the second device information from the second device when the status information acquired by the monitoring apparatus is information denoting that the first device is in a sleep mode.

2. The monitoring apparatus according to claim 1, further configured to:

individually acquire, from a plurality of devices including the first device and the second device, specific information of the devices;

identify the first device and the second device included in the multi-function apparatus on the basis of the individual specific information to generate association information associating the first device and the second device with each other; and acquire the status information from the first device specified by the association information.

3. The monitoring apparatus according to claim 1, wherein the monitoring apparatus is further configured such that:

when the status information acquired by the monitoring apparatus is not information denoting that the first device is in the sleep mode and is information denoting that the first device can output the first device information, the monitoring apparatus acquires the first device information from the first device and the second device information from the second device for a monitoring process performed at the monitoring timing and stores in a storage unit the first device information and the second device information, which have been acquired.

4. The monitoring apparatus according to claim 3, wherein the monitoring apparatus is further configured such that:

when the status information acquired by the monitoring apparatus is information denoting that the first device is in the sleep mode, the monitoring apparatus uses, for the monitoring process, the first device information and the second device information which have been most recently stored in the storage unit.

5. The monitoring apparatus according to claim 3, wherein the monitoring apparatus is further configured such that:

when the status information acquired by the monitoring apparatus is information denoting that the first device cannot output the first device information, the monitoring apparatus uses, for the monitoring process, the first device information and the second device information which have been most recently stored in the storage unit.

6. The monitoring apparatus according to claim 1, further configured to:

at a timing of collecting charge information regarding use of the multi-function apparatus, perform at least one of a process of acquiring the first device information for collecting the charge information from the first device and a process of acquiring the second device information for collecting the charge information from the second device regardless of whether or not the status information is information denoting that the first device is in the sleep mode.

7. The monitoring apparatus according to claim 1, further configured to:

receive an instruction from a user to acquire the first device information, and responsively acquire the first device information from the first device regardless of whether or not the status information is information denoting that the first device is in the sleep mode.

8. The monitoring apparatus according to claim 1, wherein the first device is a printing apparatus, and
the second device is an image scanner.

9. The monitoring apparatus according to claim 1, wherein the monitoring apparatus is further configured such that:

when the monitoring apparatus is connected to the multi-function apparatus via a network, the monitoring apparatus performs a process of acquiring the first device information from the multi-function apparatus via the network, and when the monitoring apparatus is connected to the multi-function apparatus via a Universal Serial Bus (USB) interface, the monitoring apparatus performs a process of acquiring the first device information via a first device driver for controlling the first device.

10. The monitoring apparatus according to claim 1, wherein the monitoring apparatus is further configured such that:

when the monitoring apparatus is connected to the multi-function apparatus via a network, the monitoring apparatus performs a process of acquiring the second device information from the multi-function apparatus via the network, and when the monitoring apparatus is connected to the multi-function apparatus via a Universal Serial Bus (USB) interface, the monitoring apparatus performs a process of acquiring the second device information via a second device driver for controlling the second device.

11. A monitoring method for acquiring, from a multi-function apparatus including a first device and a second device, first device information regarding the first device and second device information regarding the second device, the monitoring method comprising:

acquiring from the first device, at a monitoring timing of the multi-function apparatus, status information denoting a state of the first device;

acquiring the first device information from the first device;

determining whether the status information denoting the state of the first device denotes that the first device is in a sleep mode; and acquiring the second device information from the second device if the status information denotes that the first device is not in the sleep mode, or not acquiring the second device information from the second device if the status information denotes that the first device is in the sleep mode.

12. The method according to claim 11, further comprising:

generating association information associating the first device and the second device with each other by acquiring, from a plurality of devices including the first device and the second device, specific information of the devices, and identifying the first device and the second device included in the multi-function apparatus on the basis of the individual specific information, wherein in the acquisition of the status information, the status information is acquired from the first device specified by the association information, and in the acquiring of the first device information and the second device information, when the status information is information denoting that the first device is in the sleep mode, the acquisition of the second device information from the second device specified by the association information is not performed.

13. The method according to claim 11, wherein
in the acquiring of the first device information and the second device information, when the status information acquired in the acquisition of status information is not information denoting that the first device is in the sleep mode and is information denoting that the first device can output the first device information, the first device information is acquired from the first device and the second device information is acquired from the second device for a monitoring process performed at the monitoring timing, and the first device information and the second device information which have been acquired are stored in a storage unit.

14. The method according to claim 13, wherein
in the acquiring of the first device information and the second device information, when the status information acquired in the acquisition of status information is information denoting that the first device is in the sleep mode, the first device information and the second device information which have been most recently stored in the storage unit are used for the monitoring process.

15. The method according to claim 13, wherein
in the acquiring of the first device information and the second device information, when the status information acquired in the acquisition of status information is information denoting that the first device cannot output the first device information, the first device information and the second device information which have been most recently stored in the storage unit are used for the monitoring process.

16. The method according to claim 11, further comprising:
collecting charge information, by performing, at a timing of collecting charge information regarding use of the multi-function apparatus, at least one of a process of acquiring the first device information for collecting the charge information from the first device and a process of acquiring the second device information for collecting the charge information from the second device regardless of whether or not the status information is information denoting that the first device is in the sleep mode.

17. The method according to claim 11, further comprising:
receiving an instruction from a user for acquiring the first device information, wherein
in the acquiring of the first device information and the second device information, when the instruction for acquiring the first device information is received, the first device information is acquired from the first device regardless of whether the status information is information denoting that the first device is in the sleep mode.

18. The method according to claim 11, wherein
in the acquiring of the first device information and the second device information, for acquisition of the first device information from the first device,
when the monitoring apparatus configured to acquire the first device information is connected to the multi-function apparatus via a network, a process of acquiring the first device information from the multi-function apparatus via the network is performed, and
when the monitoring apparatus is connected to the multi-function apparatus via a Universal Serial Bus (USB) interface, a process of acquiring the first device information via a first device driver for controlling the first device is performed.

19. The method according to claim 11, wherein
in the acquiring of the first device information and the second device information, for acquisition of the second device information from the second device,
when the monitoring apparatus configured to acquire the second device information is connected to the multi-function apparatus via a network, a process of acquiring the second device information from the multi-function apparatus via the network is performed, and
when the monitoring apparatus is connected to the multi-function apparatus via a Universal Serial Bus (USB) interface, a process of acquiring the second device information via a first device driver for controlling the second device is performed.

20. A nontransitory computer-readable recording medium storing a monitoring program for acquiring from a multi-function apparatus including a first device and a second device, first device information regarding the first device and second device information regarding the second device, the monitoring program, when executed by a computer, causing the computer to execute:
a status information acquisition function of acquiring from the first device, at a monitoring timing of the multi-function apparatus, status information denoting a state of the first device; and
a device information acquisition function of acquiring the first device information from the first device and the second device information from the second device, wherein
the device information acquisition function does not perform acquisition of the second device information from the second device when the status information acquired by the status information acquisition function is information denoting that the first device is in a sleep mode.

* * * * *